(12) United States Patent
Suzuki et al.

(10) Patent No.: US 9,096,125 B2
(45) Date of Patent: Aug. 4, 2015

(54) DRIVING FORCE TRANSMISSION APPARATUS

(71) Applicant: JTEKT CORPORATION, Osaka-shi (JP)

(72) Inventors: Kunihiko Suzuki, Gamagori (JP); Takashi Hosokawa, Takahama (JP); Hiroshi Takuno, Nukata-gun (JP); Noriyuki Fujii, Hekinan (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/352,894

(22) PCT Filed: Oct. 19, 2012

(86) PCT No.: PCT/JP2012/077076
§ 371 (c)(1),
(2) Date: Apr. 18, 2014

(87) PCT Pub. No.: WO2013/058357
PCT Pub. Date: Apr. 25, 2013

(65) Prior Publication Data
US 2014/0251083 A1    Sep. 11, 2014

(30) Foreign Application Priority Data
Oct. 19, 2011    (JP) .................................. 2011-229750

(51) Int. Cl.
*F16H 37/06* (2006.01)
*B60K 17/344* (2006.01)
(Continued)

(52) U.S. Cl.
CPC ............ *B60K 17/344* (2013.01); *F16D 27/115* (2013.01); *B60K 17/35* (2013.01); *B60Y 2306/03* (2013.01); *F16D 27/004* (2013.01); *F16H 2001/325* (2013.01); *Y10T 74/19074* (2015.01)

(58) Field of Classification Search
USPC .................................. 74/665 F, 665 S, 665 T
See application file for complete search history.

(56) References Cited

U.S. PATENT DOCUMENTS 3,650,353 A * 3/1972 Abbott .......................... 184/6.12
4,745,816 A * 5/1988 Horiuchi et al. ................. 74/467
(Continued)

FOREIGN PATENT DOCUMENTS

JP    62 104029    7/1987
JP    63 219961    9/1988
(Continued)

OTHER PUBLICATIONS

International Search Report Issued Dec. 25, 2012 in PCT/JP12/077076 Filed Oct. 19, 2012.

*Primary Examiner* — Ha D Ho
(74) *Attorney, Agent, or Firm* — Oblon, McClelland, Maier & Neustadt, L.L.P.

(57) ABSTRACT

A driving force transmission apparatus including a tank which reserves lubricating oil in an accommodating space which is interposed between a housing and an inner shaft and an apparatus case which has a cylindrical accommodating portion which accommodates the housing, and in the case, the accommodating portion has an inner circumferential surface which faces an outer circumferential surface of the housing, and the tank has an oil inlet port which is opened to the inner circumferential surface of the accommodating portion and through which the lubricating oil in the accommodating space is let in based on a centrifugal force generated in association with the rotation of the housing when a four-wheel drive vehicle travels forwards in a two-wheel drive mode.

14 Claims, 16 Drawing Sheets

(51) Int. Cl.
*F16D 27/115* (2006.01)
*B60K 17/35* (2006.01)
*F16D 27/00* (2006.01)
*F16H 1/32* (2006.01)

(56) References Cited

U.S. PATENT DOCUMENTS

| | | |
|---|---|---|
| 4,879,921 A | 11/1989 | Asada et al. |
| 6,634,978 B2 * | 10/2003 | Banno et al. ............... 475/222 |
| 7,743,899 B2 * | 6/2010 | Capito ........................ 192/54.3 |
| 8,696,510 B2 * | 4/2014 | Arai ............................. 475/220 |
| 2007/0034475 A1 * | 2/2007 | Capito ........................ 192/85 CA |
| 2009/0229905 A1 * | 9/2009 | Kato et al. .................. 180/249 |

FOREIGN PATENT DOCUMENTS

| | | |
|---|---|---|
| JP | 2003 014001 | 1/2003 |
| JP | 2007 32797 | 2/2007 |
| JP | 2009 220593 | 10/2009 |

* cited by examiner (FIRST EMBODIMENT)

(FIRST EMBODIMENT)

(FIRST EMBODIMENT)

(FIRST EMBODIMENT)

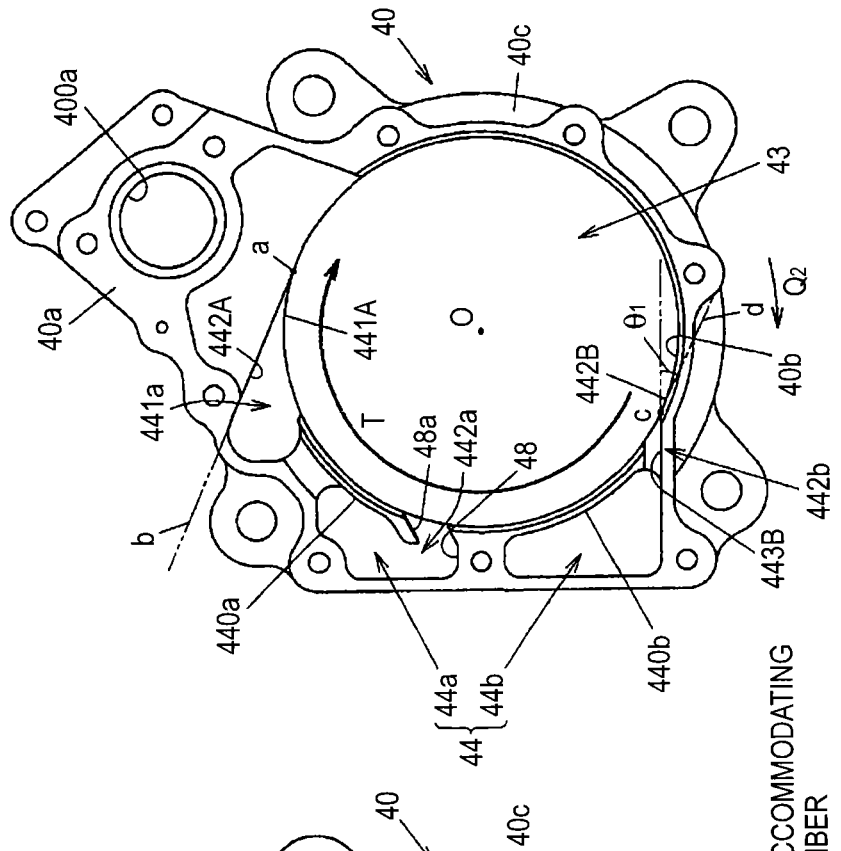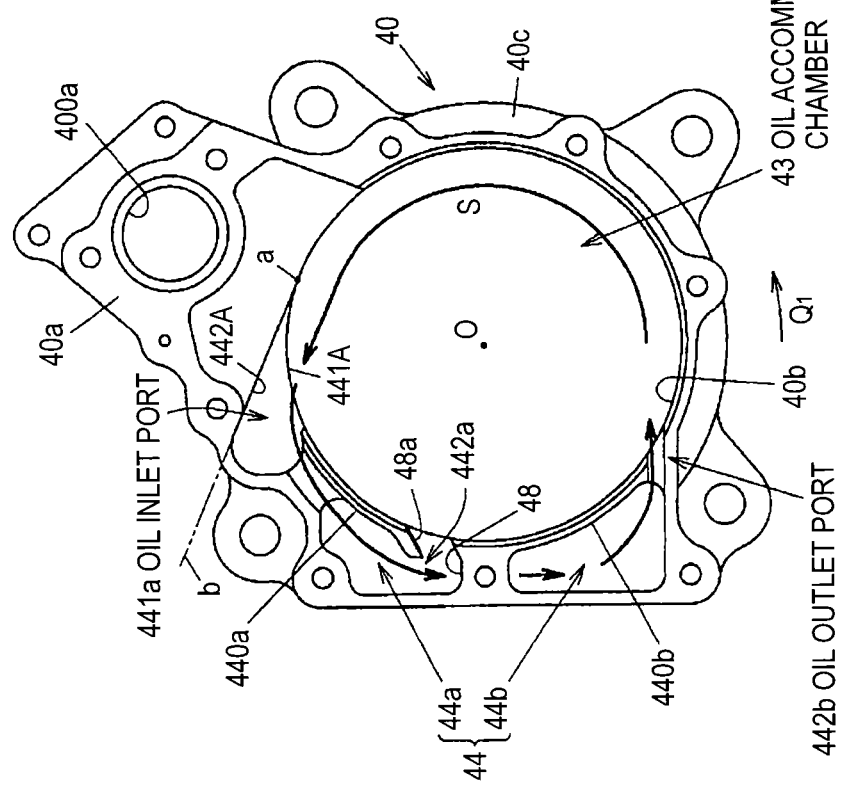

(FIRST EMBODIMENT)

(FIRST EMBODIMENT)

(SECOND EMBODIMENT)

(SECOND EMBODIMENT)

(SECOND EMBODIMENT)

(SECOND EMBODIMENT)

(SECOND EMBODIMENT)

(SECOND EMBODIMENT)

(SECOND EMBODIMENT)

(SECOND EMBODIMENT)

(SECOND EMBODIMENT)

(SECOND EMBODIMENT)

(THIRD EMBODIMENT)

DRIVING FORCE TRANSMISSION APPARATUS

TECHNICAL FIELD

The present invention relates to a driving force transmission apparatus which transmits a driving force from an input shaft to an output shaft of, for example, an automobile.

BACKGROUND ART

As a conventional driving force transmission apparatus, there is a driving force transmission apparatus which is installed in, for example, a four-wheel drive vehicle and in which a pair of rotational members are connected together by a clutch so as to transmit torque (refer to Patent Literature 1, for example).

This driving force transmission apparatus includes a first rotational member which rotates together with an input shaft, a second rotational member which can rotate on an axis of the first rotational member, a friction-type first clutch which connects the second rotational member and the first rotational member together so that torque can be transmitted therebetween, an electromagnetic clutch which is aligned in parallel to the first clutch along the axes of the first rotational member and the second rotational member, a friction-type second clutch which receives an electromagnetic force of the electromagnetic clutch to operate, and a cam mechanism which transforms a rotational force from the first rotational member to a pressing force towards the first clutch side by the clutching operation of the second clutch.

The first rotational member includes a bottomed cylindrical front housing which is opened at one end and an annular rear housing which is installed in an opening portion of the front housing and is connected to the input shaft. Then, the first rotational member receives a driving force of a drive source such as an engine of the vehicle from the input shaft to rotate.

The second rotational member is disposed so as to rotate relatively to the first rotational member on the rotational axis thereof and is connected to an output shaft.

The first clutch has an inner clutch plate and an outer clutch plate and is disposed between the first rotational member and the second rotational member. Additionally, the first clutch functions as a main clutch and connects the first rotational member and the second rotational member together so that torque can be transmitted therebetween as a result of the inner clutch plate and the outer clutch plate being brought into frictional engagement with each other.

The electromagnetic clutch is disposed on the axes of the first rotational member and the second rotational member. Then, the electromagnetic clutch generates an electromagnetic force to operate the second clutch.

The second clutch has an inner clutch plate and an outer clutch plate and is disposed on an electromagnetic clutch side of the main clutch. Then, the second clutch functions as a pilot clutch which receives the electromagnetic force of the electromagnetic clutch to operate and imparts the rotational force from the first rotational member to the cam mechanism.

The cam mechanism has a pressing portion which imparts a pressing force to the first clutch through a cam action resulting from the rotational force from the first rotational member and is disposed between the first rotational member and the second rotational member.

Based on the configuration described above, when the driving force from the engine side is inputted into the first rotational member via the input shaft, the first rotational member rotates about the axis thereof. Here, when the electromagnetic clutch is energized, the second clutch operates based on the electromagnetic force of the electromagnetic clutch.

Next, when the cam mechanism receives the rotational force from the first rotational member when the second clutch is in operation, this rotational force is transformed into the pressing force by the cam mechanism, and this pressing force is imparted to the first clutch.

Then, the inner clutch plate and the outer clutch plate of the first clutch are closed to each other and brought into frictional engagement with each other, and the first rotational member and the second rotational member are connected together so that torque can be transmitted therebetween by the frictional engagement. This enables the driving force on the engine side to be transmitted from the input shaft to the output shaft via the driving force transmission apparatus.

PRIOR ART LITERATURE

Patent Literature

Patent Literature 1: JP-A-2003-14001

SUMMARY OF THE INVENTION

Problem that the Invention is to Solve

Incidentally, according to the driving force transmission apparatus shown in Patent Literature 1, when the four-wheel drive vehicle is traveling forwards in a two-wheel drive mode, the cam mechanism receives not only the rotational force from the second rotational member but also the rotational force of the first rotational member due to so-called drag torque which is generated between the inner clutch plate and the outer clutch plate of the second clutch based on the viscosity of the lubricating oil, and this rotational force generates a cam thrust, whereby the pressing portion of the cam mechanism presses against the first clutch. Because of this, the first clutch receives the pressing force which is amplified by the cam mechanism, whereby the inner clutch plate and the outer clutch plate of the first clutch are brought into frictional engagement with each other. As a result of this, there are fears that the turning performance and fuel economy of the vehicle are badly affected.

Consequently, an object of the invention is to provide a driving force transmission apparatus which can suppress the bad influences imposed by the drag torque.

Means for Solving the Problem

With a view to achieving the object, the invention provides a driving force transmission apparatus described under (1) to (14) below.

(1) A driving force transmission apparatus comprising a cylindrical first rotational member which is configured to rotate by a drive source of a four-wheel drive vehicle which can be switched between a four-wheel drive mode and a two-wheel drive mode, a second rotational member at least part of which is accommodated in an interior of the first rotational member and which is disconnectably connected to the first rotational member via a clutch, and a case having a tank portion which is configured to reserve a lubricating oil in an accommodating space interposed between the second rotational member and the first rotational member, and a cylindrical accommodating portion which accommodates the first rotational member, wherein, in the case, the accommodating portion has an inner circumferential surface which faces an outer circumferential surface of the first rotational member, and the tank portion has an oil inlet port which is opened to the inner circumferential surface of the accommodating portion and through which the lubricating oil in the accommodating space is let in based on a centrifugal force which is generated as the first rotational member rotates when the four-wheel drive vehicle travels forwards in the two-wheel drive mode. Additionally, the cylindrical first rotational member includes a rotational member whose outer circumferential surface is totally or partially formed into an irregular surface which represents, for example, a corolla-shaped axial section or an axial section which results from an inner circumferential surface where splines are formed in addition to a rotational member whose outer circumferential surface is made up of a cylindrical surface. In addition, the cylindrical accommodating portion has an inner circumferential surface which accommodates the first rotational member rotatably.

(2) In the driving force transmission apparatus described under (1) above, the case is such that the oil inlet port of the tank portion is opened along a direction of an oil flow of the lubricating oil which is generated as the first rotational member rotates when the four-wheel drive vehicle travels forwards in the two-wheel drive mode.

(3) In the driving force transmission apparatus described under (1) or (2) above, the case includes an annular space which is interposed between the inner circumferential surface of the accommodating portion and the outer circumferential surface of the first rotational member, and has an oil accommodating chamber which communicates with the accommodating space.

(4) In the driving force transmission apparatus described under (2) above, the case has in the tank portion an oil outlet port which is situated downstream of the oil inlet port when the four-wheel drive vehicle travels forwards in the two-wheel drive mode, and the oil outlet port is opened along a direction which intersects the direction of the oil flow.

(5) In the driving force transmission apparatus described under (4) above, the case is such that an opening area of the oil inlet port in the tank portion is set to an area which is larger than an opening area of the oil outlet port.

(6) In the driving force transmission apparatus described under any of (3) to (5) above, the first rotational member has a pump forming portion where a pump is formed between the outer circumferential surface of the first rotational member and an inner circumferential surface of the case so as to cause the lubricating oil in the accommodating space to flow out into the oil accommodating chamber.

(7) In the driving force transmission apparatus described under (6) above, the first rotational member is set to such a dimension that an outside diameter of the pump forming portion gradually increases from an oil inlet side towards an oil outlet side.

(8) In the driving force transmission apparatus described under any of (1) to (7) above, the case is such that the tank portion is formed by a rotational member which rotates together with the first rotational member.

(9) In the driving force transmission apparatus described under any of (1) to (8) above, the second rotation member is disconnectably connected to the first rotational member by a clutching operation of the clutch based on an operation of a cam mechanism which receives a rotational force from an auxiliary drive source which is different from the drive source.

(10) In the driving force transmission apparatus described under (9) above, the cam mechanism comprises a cam member which receives the rotational force from the auxiliary drive source to rotate, a rolling member which rolls on the cam member, and a retainer which has an output member outputting a cam thrust to the clutch side as the rolling member rolls, the output member being restricted from rotating about a rotational axis, and which can move in a direction of the rotational axis while retaining the rolling member rollingly.

(11) In the driving force transmission apparatus described under (9) or (10) above, the cam mechanism includes, in the cam thrust, a first cam thrust for reducing a clearance between a first clutch plate and a second clutch plate which make up the clutch and which are adjacent to each other, and a second cam thrust for bringing the first clutch plate and the second clutch plate into friction engagement with each other, and the cam mechanism transforms the rotational force from the auxiliary drive source into the first cam thrust and the second cam thrust.

(12) In the driving force transmission apparatus described under (10) or (11) above, the cam mechanism is such the cam member has a gear portion which meshes with the auxiliary drive source via a speed reducing mechanism and a gear transmission mechanism.

(13) In the driving force transmission apparatus described under (12) above, the speed reducing mechanism is an eccentric oscillating speed reducing mechanism into which the rotational force from the auxiliary drive source is input and which reduces speed of the rotational force to output the rotational force to the gear transmission mechanism.

(14) In the driving force transmission apparatus described under (13) above, the speed reducing mechanism comprises: a rotational shaft an axis of which is a rotational axis of the auxiliary drive source and which has an eccentric portion a center axis of which is an axis which is parallel to the axis of the rotational shaft; an input member which is made up of an external gearwheel having a center hole which fits on the eccentric portion of the rotational shaft via a rolling bearing, and a plurality of through holes which are aligned at equal intervals around an axis of the center hole; a rotating force imparting portion which is made up of an internal gearwheel which meshes with the input member with a number of teeth which is larger than a number of teeth of the external gearwheel; and output members which receive a rotational force imparted by the rotating force imparting member from the input member to output it to the gear transmission mechanism, and which are inserted through the plurality of through holes.

Advantage of the Invention

According to the invention, it is possible to suppress the bad influences imposed by the drag torque.

BRIEF DESCRIPTION OF THE DRAWINGS

FIGS. 5(a) and 5(b) are front views depicting oil flows of lubricating oil which are generated in a tank of the driving force transmission apparatus according to the first embodiment of the invention when a four-wheel drive vehicle travels forwards in a four-wheel drive mode and travels forwards in a two-wheel drive mode. FIG. 5(a) shows an oil flow generated when the vehicle travels forwards in the two-wheel drive mode, and FIG. 5(b) shows an oil flow generated when the vehicle travels forwards in the four-wheel drive mode.

MODE FOR CARRYING OUT THE INVENTION

First Embodiment

Figure 1:
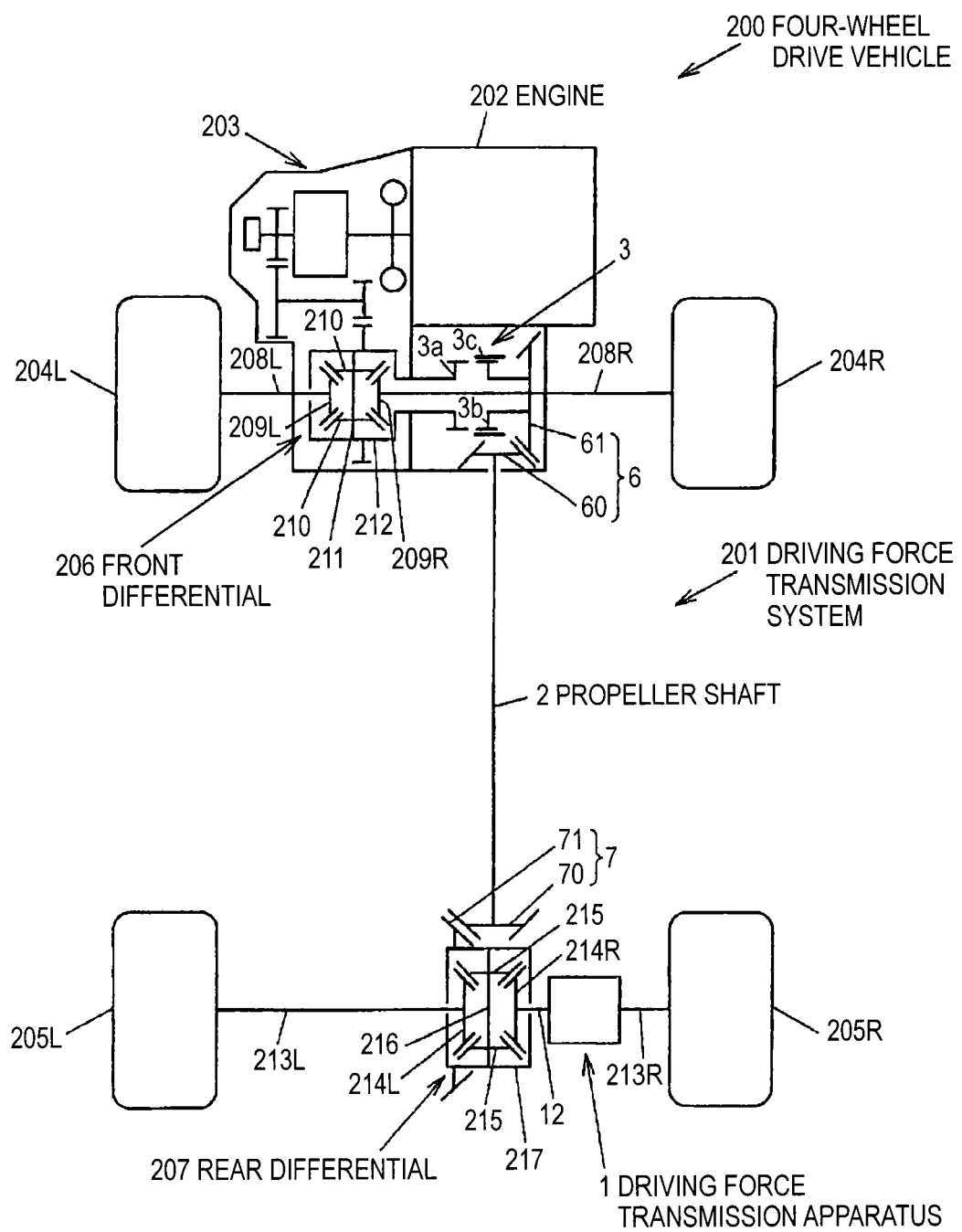
FIG. 1 is a plan view schematically depicting a vehicle in which a driving force transmission apparatus according to a first embodiment of the invention is installed.

FIG. 1 shows schematically a four-wheel drive vehicle. As shown in FIG. 1, a four-wheel drive vehicle 200 includes a driving force transmission system 201, an engine 202 as a drive source, a transmission 203, front wheels 204L, 204R as main driving wheels, and rear wheels 205L, 205R as auxiliary driving wheels.

The driving force transmission system 201 is disposed on a driving force transmission line from the transmission 203 to the rear wheels 205L, 205R together with a front differential 206 and a rear differential 207 and is installed on a vehicle body (not shown) of the four-wheel drive vehicle 200.

Additionally, the driving force transmission system 201 has a driving force transmission apparatus 1, a propeller shaft 2 and a driving force connection and disconnection apparatus 3 and is configured so as to switch the driving condition of the four-wheel drive vehicle 200 from a four-wheel drive mode to a two-wheel drive mode and from the two-wheel drive mode to the four-wheel drive mode. The driving force transmission apparatus 1 will be described in detail later.

The front differential 206 has side gears 209L, 209R, a pair of pinion gears 210, a gear supporting member 211 and a front differential case 212. The side gears 209L, 209R are connected to front wheel axle shafts 208L, 208R, respectively. The pair of pinion gears 210 mesh with the side gears 209L, 209R with their gear shafts intersecting the side gears 209L, 209R at right angles. The gear supporting member 211 supports the pair of pinion gears 210. The front differential case 212 accommodates the gear supporting member 211, the pair of pinion gears 210, and the side gears 209L, 209R. The front differential 206 is disposed between the transmission 203 and the driving force connection and disconnection apparatus 3.

The rear differential 207 has side gears 214L, 214R, a pair of pinion gears 215, a gear supporting member 216 and a rear differential case 217. The side gears 214L, 214R are connected to rear wheel axle shafts 213L, 213R, respectively. The pair of pinion gears 215 mesh with the side gears 214L, 214R with their gear shafts intersecting the side gears 214L, 214R at right angles. The gear supporting member 216 supports the pair of pinion gears 215. The rear differential case 217 accommodates the gear supporting member 216, the pair of pinion gears 215, and the side gears 214L, 214R. The rear differential 207 is disposed between the propeller shaft 2 and the power transmission apparatus 1.

The engine 202 drives the front wheels 204L, 204R by outputting a driving force to the front axle shafts 208L, 208R via the transmission 203 and the front differential 206.

Additionally, the engine 202 drives the rear wheel 205L by outputting the driving force to the rear axle shaft 213L via the transmission 203, the driving force connection and disconnection apparatus 3, the propeller shaft 2 and the rear differential 207 and drives the other rear wheel 205R by outputting the driving force to the other rear axle shaft 213R via the transmission 203, the driving force connection and disconnection apparatus 3, the propeller shaft 2, the rear differential 207 and the driving force transmission apparatus 1.

The propeller shaft 2 is disposed between the rear differential 207 and the driving force connection and disconnection apparatus 3. Then, the propeller shaft 2 receives the driving force of the engine 202 from the front differential case 212 and transmits it from the front wheels 204L, 204R to the rear wheels 205L, 205R.

A front wheel gear mechanism 6 which includes a drive pinion 60 and a ring gear 61 which mesh with each other is disposed at a front wheel side end portion of the propeller shaft 2. A rear wheel gear mechanism 7 which includes a drive pinion 70 and a ring gear 71 which mesh with each other is disposed at a rear wheel side end portion of the propeller shaft 2.

The driving force connection and disconnection apparatus 3 is made up of, for example, a dog clutch which has a first spline portion 3a which cannot rotate relative to the front differential case 212, a second spline portion 3b which cannot rotate relative to the ring gear 61, and a sleeve 3c which can be spline fitted on the first spline portion 3a and the second spline portion 3b, is disposed on a side of the four-wheel drive vehicle 200 where the front wheels 214L, 214R are disposed, and is connected to a vehicle ECU (Electronic Control Unit, not shown) via an actuator (not shown). Additionally, the driving force connection and disconnection apparatus 3 is configured so as to disconnectably connect the propeller shaft 2 and the front differential case 212 to each other.

(Overall Configuration of the Driving Force Transmission Apparatus 1)

Figure 2:
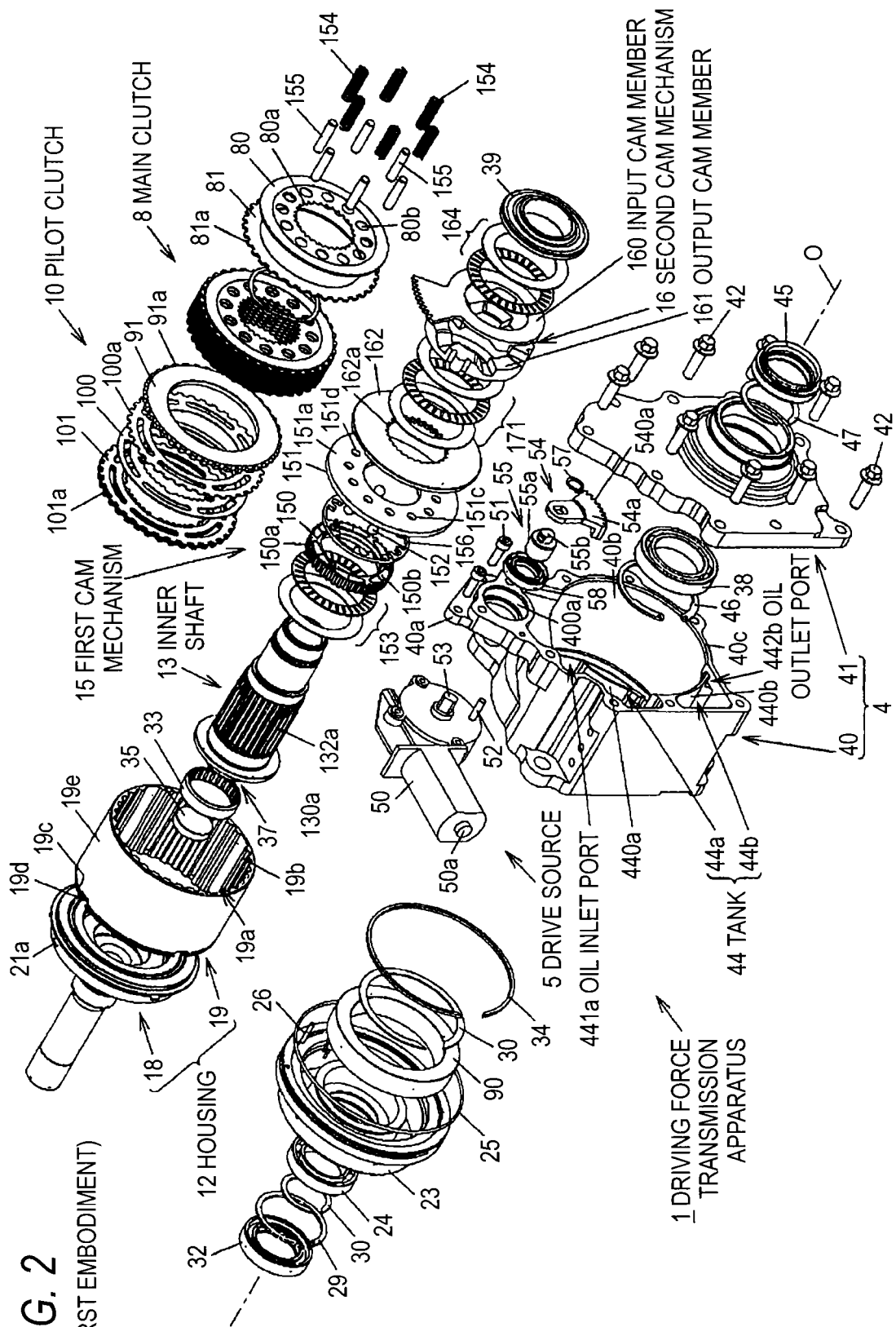
FIG. 2 is an exploded perspective view depicting a whole of the driving force transmission apparatus according to the first embodiment of the invention.
Figure 3:
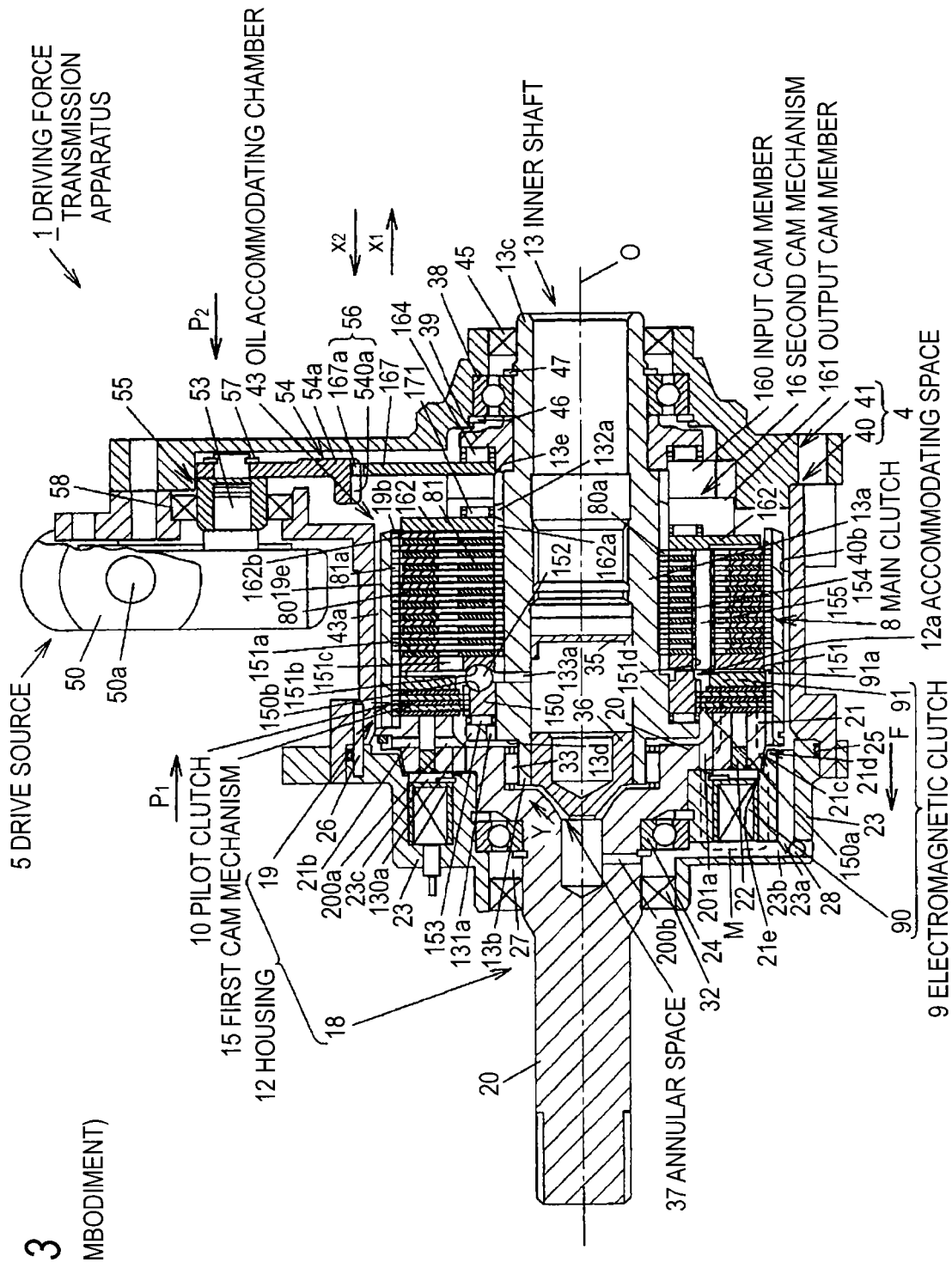
FIG. 3 is a sectional view depicting a whole of the driving force transmission apparatus according to the first embodiment of the invention. In the figure, an upper half portion shows a disconnected state, and a lower half portion shows a connected state.
Figure 4:
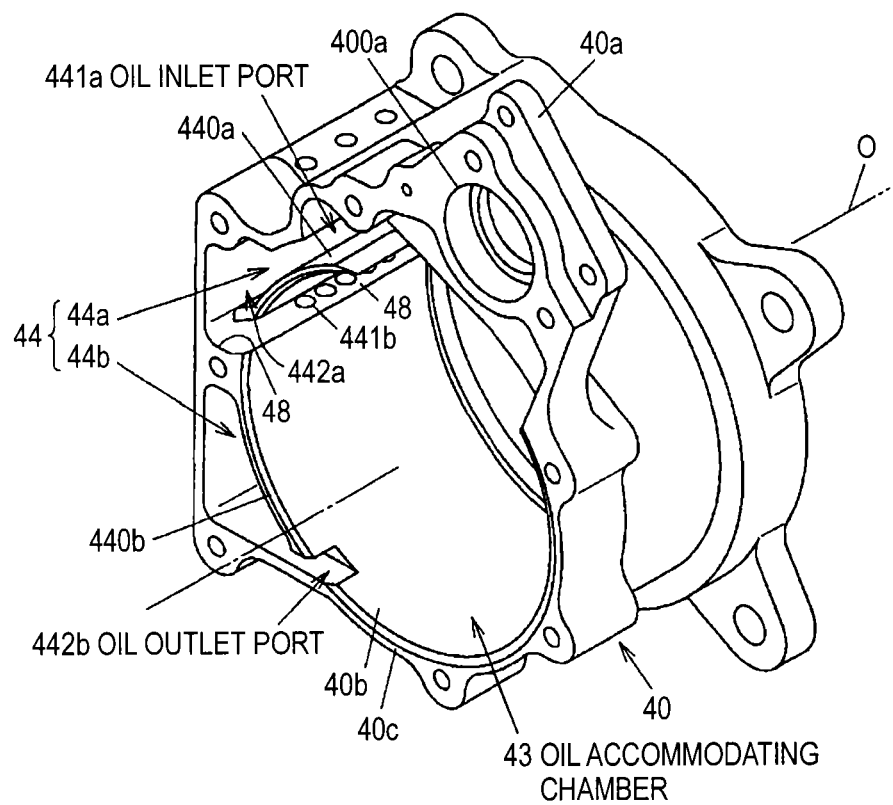
FIG. 4 is a perspective view depicting a case main body of an apparatus case of the driving force transmission apparatus according to the first embodiment of the invention.
Figure 6:
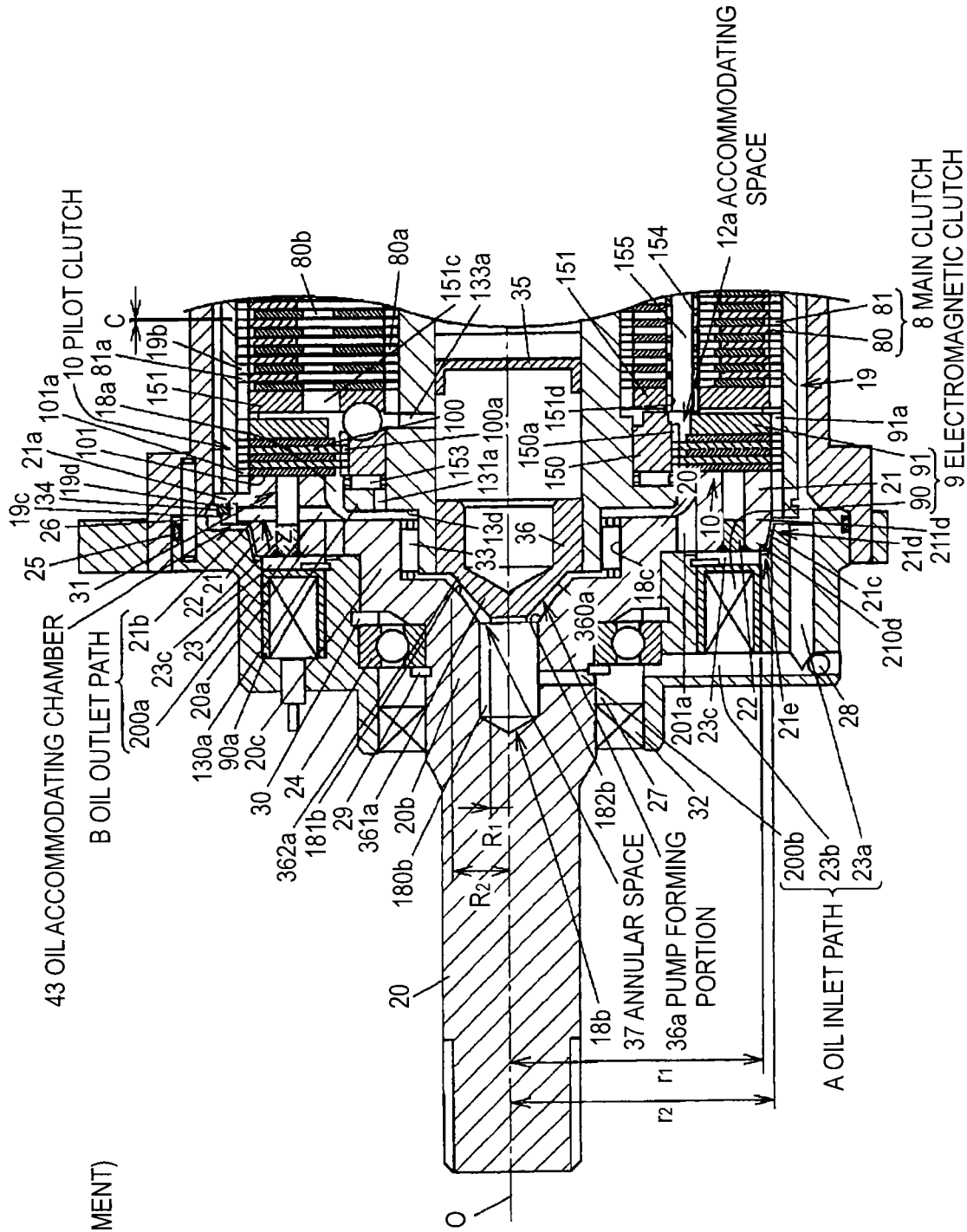
FIG. 6 is a sectional view depicting a pump forming portion of the driving force transmission apparatus according to the first embodiment of the invention.
Figure 7:
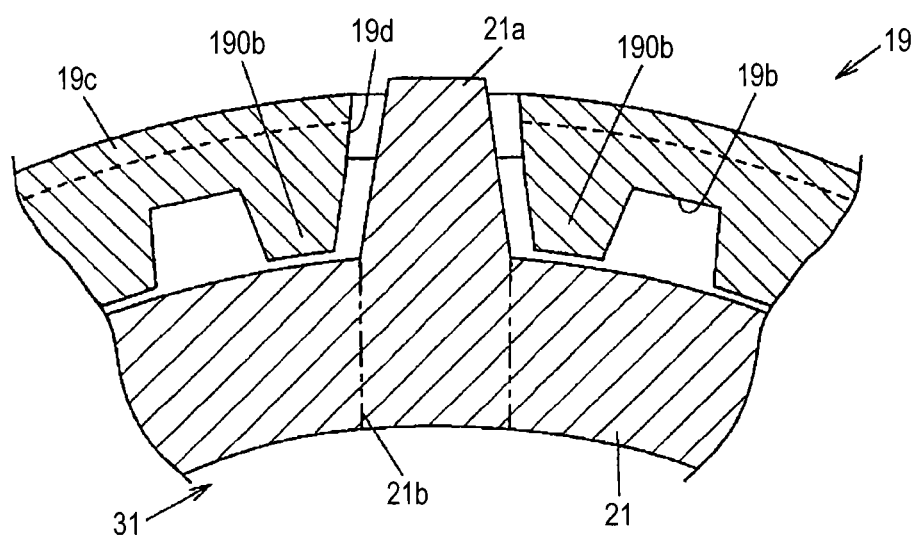
FIG. 7 is a sectional view depicting an oil path of an oil outlet path in the driving force transmission apparatus according to the first embodiment of the invention.

FIGS. 2 and 3 show the driving force transmission apparatus. FIG. 4 shows an apparatus case. FIGS. 5(a) and 5(b) show oil flows of lubricating oil. FIG. 6 shows a pump forming portion. FIG. 7 shows fitting of a front housing and a rear housing. As shown in FIGS. 2 and 3, the driving force transmission apparatus 1 has a main clutch (a multiple disc clutch) 8 as a first clutch, an electromagnetic clutch 9, a pilot clutch 10 as a second clutch, a housing 12 as a first rotational member, an inner shaft 13 as a second rotational member, a first cam mechanism 15 and a second cam mechanism 16, is disposed on a rear wheel 205R side of the four-wheel drive vehicle 200 (shown in FIG. 1), and is accommodated within an apparatus case 4.

In addition, the driving force transmission apparatus 1 is disposed in a position where the propeller shaft 2 and the rear wheel axle shaft 213L (shown in FIG. 1) are connected together. Additionally, the driving force transmission apparatus 1 is configured so as to disconnectably connect the propeller shaft 2 (shown in FIG. 1) and the rear wheel axle shaft 213R (shown in FIG. 1) to each other.

By adopting this configuration, when the propeller shaft 2 and the rear wheel axle shaft 213R are connected together by the driving force transmission apparatus 1, the rear wheel axle shaft 213L and the propeller shaft 2 are connected together so that torque can be transmitted therebetween via the gear mechanism 7 and the rear differential 207 (both of which are shown in FIG. 1), while the other rear wheel axle shaft 213R and the propeller shaft 2 are connected together so that torque can be transmitted therebetween via the gear mechanism 7, the rear differential 207 and the driving force transmission apparatus 1. On the other hand, when the connection between the propeller shaft 2 and the rear wheel axle shaft 213R by the driving force transmission apparatus 1 is released, although the rear wheel axle shaft 213L and the propeller shaft 2 are kept connected via the gear mechanism 7 and the rear differential 207, the connection between the other rear wheel axle shaft 213R and the propeller shaft 2 is interrupted.

As shown in FIGS. 2 to 4, the apparatus case 4 includes a case main body 40 which is opened to one side (a right-hand side in FIG. 3) of a rotational axis O and a case lid member 41 which closes an opening portion of the case main body 40 and is disposed on the vehicle body of the four-wheel drive vehicle 200 (shown in FIG. 1). Additionally, the apparatus case 4 accommodates part of the housing 12 and part of the inner shaft 13 in an interior thereof.

The case main body 40 has an accommodating portion 40c, a mounting portion 40a and a tank 44 as a tank portion.

The accommodating portion 40c is formed of a substantially cylindrical member having an inner circumferential surface 40b which faces an outer circumferential surface 19e of a rear housing 19. An annular space 43a is provided within the case main body 40, and this annular space 43a is interposed between the inner circumferential surface 40b of the accommodating portion 40c and the outer circumferential surface 19e of the rear housing 19. An oil accommodating chamber 43 is provided within the case main body 40 and this oil accommodating chamber 43 communicates with an accommodating space 12a of the housing 12.

The mounting portion 40a is provided integrally with the accommodating portion 40c so as to project radially outwards of the accommodating portion 40c. A cam operating drive source 5, which is different from the engine 202 (shown in FIG. 1), is mounted on the mounting portion 40a. A through hole 400a is provided in the mounting portion 40a, and this through hole 400a is opened in an axial direction which is parallel to the rotational axis O.

The tank 44 is disposed radially outwards of the accommodating portion 40c and outside the oil accommodating chamber 43. The tank 44 is provided integrally with the accommodating portion 40c. The tank 44 has a first tank portion 44a and a second tank portion 44b. The tank 44 can reserve lubricating oil in the oil accommodating chamber 43 and the accommodating space 12a.

As shown in FIGS. 5(a) and 5(b), the first tank portion 44a is disposed on an upstream side of the second tank portion 44b in an oil flow S of lubricating oil (in an upper portion of the tank 44 in FIG. 4) which is formed as the housing 12 rotates in a direction indicated by an arrow Q1 when the four-wheel drive vehicle 200 (shown in FIG. 1) travels forwards in the two-wheel drive mode and is formed by a bulkhead 440a which makes up part of the inner circumferential surface 40b of the accommodating portion 40c and an external wall of the apparatus case 4.

An oil inlet port 441a is provided in the first tank portion 44a, and this oil inlet port 441a functions as a flow port at an upstream side of the first tank portion 44a and allows lubricating oil in the oil accommodating chamber 43 to be let in therethrough when the four-wheel drive vehicle 200 travels forwards in the two-wheel drive mode.

The oil inlet port 441a is opened to the inner circumferential surface 40b of the accommodating portion 40c. Assuming that a flow of lubricating oil which is formed as the housing 12 rotates when the four-wheel drive vehicle 200 travels forwards in the two-wheel drive mode is referred to as the oil flow S and that a position of a portion where an opening surface (an imaginary circumferential surface) 441A intersects the inner circumferential surface 40b which lies on an upstream side of the oil flow S is referred to as a point of intersection a, the oil inlet port 441a has an inner surface 442A which contains a tangent b to the inner circumferential surface 40b which passes through the point of intersection a. The oil inlet port 441a is opened, in a circumferential direction of the housing 12, in the first tank portion 44a in an opposite direction to a direction in which the housing 12 rotates when the four-wheel drive vehicle 200 travels forwards in the two-wheel drive mode. The oil inlet port 441a is opened, in the circumferential direction of the housing 12, in the first tank portion 44a in a direction in which the inner shaft 13 rotates when the four-wheel drive vehicle 200 travels forwards in the two-wheel drive mode. The oil inlet port 441a is opened, in the circumferential direction of the housing 12, to the upstream side of the oil flow S of lubricating oil as viewed from an interior of the first tank portion 44a. The oil inlet port 441a is opened along the direction of the oil flow S of lubricating oil which is formed as the housing 12 rotates when the four-wheel drive vehicle 200 travels forwards in the two-wheel drive mode (along the inner circumferential surface 40b of the case main body 40). By adopting this configuration, a smooth introduction of the lubricating oil from the oil inlet port 441a into the interior of the first tank portion 44a is effected when the four-wheel drive vehicle 200 (show in FIG. 1) travels forwards in the two-wheel drive mode.

The oil inlet port 441a is opened, in the circumferential direction of the housing 12, in the first tank portion 44a in a direction in which the housing 12 rotates when the four-wheel drive vehicle 200 travels forwards in the four-wheel drive mode. The oil inlet port 441a is opened, in the circumferential direction of the housing 12, in the first tank portion 44a in a direction in which the inner shaft 13 rotates when the four-wheel drive vehicle 200 travels forwards in the four-wheel drive mode. The oil inlet port 441a is opened, in the circumferential direction of the housing 12, in the first tank portion 44a at a downstream side of an oil flow T of lubricating oil as viewed from the interior of the first tank portion 44a. The oil inlet port 441a is opened in a direction which intersects a direction of the oil flow T of lubricating oil which is formed as the housing 12 rotates when the four-wheel drive vehicle 200 travels forwards in the four-wheel drive mode. The oil inlet port 441a is opened, in the circumferential direction of the housing 12, at the downstream side of the oil flow T of lubricating oil as seen from the interior of the first tank portion 44a. By adopting this configuration, a smooth introduction of the lubricating oil from the oil inlet port 441a into the interior of the first tank portion 44a is made difficult when the four-wheel drive vehicle 200 travels forwards in the four-wheel drive mode.

In addition, an oil outlet port 442a is provided in the first tank portion 44a, and this oil outlet port 442a functions as a flow port at a downstream side of the oil flow S of lubricating oil when the four-wheel drive vehicle 200 travels forwards in the two-wheel drive mode and is opened in a direction which is parallel to the axial direction (the rotational axis O) of the case main body 40.

The second tank portion 44b is disposed at a downstream side of the first tank portion 44a in the oil flow S (in a lower portion of the tank 44 in FIG. 4) and is formed, similarly to the first tank portion 44a, by a bulkhead 440b which makes up part of the inner circumferential surface 40b of the accommodating portion 40c and the external wall of the apparatus case 4. An internal capacity of the second tank portion 44b is set to a capacity which is larger than an internal capacity of the first tank portion 44a. Additionally, an oil receiving portion 48 is interposed between the second tank portion 44b and the first tank portion 44a, and this oil receiving portion 48 has a concave sectional shape and includes a flow port 48a which communicates with the oil outlet port 442a and the oil accommodating chamber 43 and which is opened to the inner circumferential surface 40b of the accommodating portion 40c.

A length of the bulkhead 440b in the direction of the rotational axis O is set to a dimension which is substantially equal to a length of the case main body 40 in the direction of the rotational axis O and is larger than a length of the bulkhead 440a of the first tank portion 44a in the direction of the rotational axis O.

An oil inlet port 441b is provided in the second tank portion 44b, and this oil inlet port 441b functions as a flow port at an upstream side and communicates with the oil receiving portion 48.

The oil inlet port 441b is opened to the oil receiving portion 48. The oil inlet port 441b resides on the side of the first tank portion 44a as viewed from the second tank portion 44b. The oil inlet port 441b is opened, in the circumferential direction of the housing 12, in the second tank portion 44b in an opposite direction to a direction in which the housing 12 rotates when the four-wheel drive vehicle 200 travels forwards in the two-wheel drive mode. The oil inlet port 441b is opened, in the circumferential direction of the housing 12, in the second tank portion 44b in a direction in which the housing 12 rotates when the four-wheel drive vehicle 200 travels forwards in the four-wheel drive mode.

In addition, an oil outlet port 442b is provided in the second tank portion 44b, and this oil outlet port 442b functions as a flow part at a downstream side and is opened along a direction which intersects the direction of the oil flow S.

The oil outlet port 442b is opened to the inner circumferential surface 40b of the accommodating portion 40c. Assuming that a position of a portion where an opening surface (an imaginary circumferential surface) 442B intersects the inner circumferential surface 40b which lies on an upstream side of the oil flow T is referred to as a point of intersection c, the oil outlet port 442b has an inner surface 443B which intersects a tangent d on the inner circumferential surface 40b which passes through the point of intersection c. The oil outlet port 442b resides at an opposite side to the first tank portion 44a as viewed from the tank portion 44b. The oil outlet port 442b is opened, in the circumferential direction of the housing 12, in the second tank portion 44b in a direction in which the housing 12 rotates when the four-wheel drive vehicle 200 travels forwards in the two-wheel drive mode. The oil outlet port 442b is opened, in the circumferential direction of the housing 12, in the second tank portion 44b in an opposite direction to a direction in which the housing 12 rotates when the four-wheel drive vehicle 200 travels forwards in the four-wheel drive mode. By adopting this configuration, a smooth introduction of the lubricating oil from the oil outlet port 442b into an interior of the second tank portion 44b is made difficult when the four-wheel drive vehicle 200 travels forwards in the two-wheel drive mode.

Since the oil outlet port 442b is also opened in a direction which interests the direction of the oil flow T, a smooth introduction of the lubricating oil from the oil outlet port 442b into the interior of the tank 44 is made difficult when the four-wheel drive vehicle 200 travels forwards in the four-wheel drive mode, whereby a sufficient amount of lubricating oil is reserved in the accommodating space 12a and the oil accommodating chamber 43. In other words, an angle (a minor angle) $f_1$ which is formed by the inner surface 443B to which the oil outlet port 442b is opened and the tangent d to the inner circumferential surface 40b of the accommodating portion 40c is set to an angle which is larger than an angle (a minor angle) $\theta_2$ (in this embodiment, the inner surface 442A coincides with the tangent b, $\theta_2=0°$. $\theta_2$ is not shown) which is formed by the inner surface 442A of the oil inlet port 441a and the tangent b to the inner circumferential surface 40b of the accommodating portion 40c ($\theta_1<\theta_2$). Therefore, a smooth introduction of the lubricating oil from the oil outlet port 442b into the interior of the tank 44 is made difficult when the four-wheel drive vehicle 200 travels forwards in the four-wheel drive vehicle, whereby a sufficient amount of lubricating oil is reserved in the accommodating space 12a and the oil accommodating chamber 43.

An opening area of the oil outlet port 442b is set to an area which is smaller than an opening area of the oil inlet port 441a in the first tank portion 44a. By adopting this configuration, an amount of lubricating oil which flows into the interior of the tank 44 (the first tank portion 44a) through the oil inlet port 441a becomes larger than an amount of lubricating oil which flows out from the tank 44 (the second tank portion 44b) through the oil outlet port 442b when the four-wheel drive vehicle 200 travels forwards in the two-wheel drive mode, whereby the lubricating oil is easily reserved within the tank 44 accordingly.

The case lid member 41 is attached to the case main body 40 by bolts 42 with a washer and is formed by a cap member which allows the inner shaft 13 (which will be described later) to be inserted therethrough as a whole.

As shown in FIGS. 2 and 3, the drive source 5 incorporates therein a speed reducing mechanism (not shown) and has an electric motor 50, being mounted at the mounting portion 40a of the case main body 40 with bolts 51. The drive source 5 functions as an auxiliary drive source which is different from the engine 202 (shown in FIG. 1). The drive source 5 is mounted on the case main body 40 by the use of a positioning pin 52. As the speed reducing mechanism, for example, a gear speed reducing mechanism is used, and this gear speed reducing mechanism has a worm wheel (not shown) which is fixed to a motor shaft 50a of the electric motor 50 and a worm 53 which meshes with the worm wheel. A transmission member 54 which transmits a rotational force to the second cam mechanism 16 (which will be described later) as an operation force thereof is mounted on the drive source 5 (the worm 53) via a connecting device 55.

The transmission member 54 has a curved surface portion 54a having a predetermined radius of curvature and is disposed above the second cam mechanism 16, being accommodated within the apparatus case 4. An external gear 540a which makes up part of a gear transmission mechanism 56 is provided on the curved surface portion 54a. The transmission member 54 is attached to the connecting device 55 by the use of a snap ring 57.

The connecting device 55 has a cylindrical portion 55a which connects to the worm 53 of the speed reducing mechanism and a shaft portion 55b which connects to the transmission member 54 and is disposed between the worm 53 and the transmission member 54. A seal mechanism 58 is mounted on an outer circumferential surface of the cylindrical portion 55a so as to be interposed between an inner circumferential surface of the through hole 400a and the outer circumferential surface of the cylindrical portion 55a, and the snap ring 57 is mounted on an outer circumferential surface of the shaft portion 55b.

(Configuration of the Main Clutch 8)

The main clutch 8 is made up of a friction-type main clutch which has a plurality of inner clutch plates 80 and a plurality of outer clutch plates 81 and is disposed between the housing 12 and the inner shaft 13.

Additionally, the main clutch 8 disconnectably connects the housing 12 and the inner shaft 13 to each other by bringing adjacent inner and outer clutch plates of the inner clutch plates 80 and the outer clutch plates 81 into friction engagement with each other and releasing the friction engagement therebetween.

The inner clutch plates 80 and the outer clutch plates 81 are disposed alternately along the direction of the rotational axis O and are formed into an annular friction plate as a whole. A clearance between any two adjacent clutch plates of the inner clutch plates 80 and the outer clutch plates 81 is set to a dimension which prevents a friction engagement of the two adjacent clutch plates which would otherwise be generated due to drag torque based on the viscosity of the lubricating oil when the four-wheel drive vehicle 200 (shown in FIG. 1) travels forwards in the two-wheel drive mode.

The inner clutch plate 80 has a straight spline fitting portion 80a on an inner circumferential portion thereof. The inner clutch plate 80 is fitted on a straight spline fitting portion 132a of a cylindrical portion 13a (the inner shaft 13) so as to be connected to the inner shaft 13 in such a way as not to rotate relative to the inner shaft 13 but to move relative thereto.

A plurality of oil holes 80b (shown in FIGS. 2 and 6) are provided in the inner clutch plate 80 so as not only to be aligned side by side along a circumferential direction thereof but also to be opened in the direction of the rotational axis O. In the plurality of inner clutch plates 80, an endmost inner clutch plate on an electromagnetic side thereof functions as an input portion on one side of the main clutch 8. When this endmost inner clutch plate receives a pressing force (a first cam thrust) $P_1$ towards the outer clutch 81 from a main cam 151 (which will be described later) of the first cam mechanism 15, the endmost inner clutch plate moves in the direction of the pressing force to thereby bring the adjacent inner clutch plates 80 and outer clutch plates 81 into friction engagement with each other. Additionally, in the plurality of inner clutch plates 80, an endmost inner clutch plate on an opposite side to the side which faces the electromagnetic clutch 9 functions as an input portion on the other side of the main clutch 8. When this endmost inner clutch receives a pressing force (a second cam thrust) $P_2$ towards the outer clutch plate 81 from an output cam member 161 (which will be described later) of the second cam mechanism 16 via a pressing member 162 (which will be described later), the endmost inner clutch plate moves in the direction of the pressing force to thereby reduce clearances C (shown in FIG. 6) between the adjacent inner clutch plates 80 and outer clutch plates 81 to, for example, C=0.

The outer clutch plate 81 has a straight spline fitting portion 81a on an outer circumferential portion thereof. The outer clutch plate 81 is fitted on a straight spline fitting portion 19b (which will be described later) of the rear housing 19 so as to be connected to the housing 12 in such a way as not to rotate relative to the housing 12 but to move relative thereto.

(Configuration of the Housing 12)

The housing 12 is made up of a front housing 18 and the rear housing 19, is disposed on the axis (the rotational axis O) of the other rear wheel axle shaft 213R (shown in FIG. 1) and is connected to the side gear 214R (shown in FIG. 1). Additionally, the housing 12 is formed by a cylindrical member which is opened to an opposite side to the front housing 18 as a whole. The accommodating space 12a is provided in the housing 12 so as to be interposed between an inner circumferential surface thereof and an outer circumferential surface of the inner shaft 13.

The front housing 18 includes a first to third housing elements 20 to 22, is mounted on an inner circumferential surface of an opening in the rear housing 19 and is supported rotatably in a coil holder 23 via a ball bearing 24.

The coil holder 23 has a seal member 25 which is mounted on an outer circumferential surface of the coil holder 23 so as to be interposed between the outer circumferential surface of the coil holder 23 and an inner circumferential surface of the apparatus case 4 and is formed, as a whole, by a flanged annular member through which the front housing 18 is inserted. The coil holder 23 is mounted in the apparatus case 4 by a positioning pin 26. In addition, the coil holder 23 has an annular space 27 which is defined around an inner circumference thereof between the coil holder 23 and an outer circumferential surface of the front housing 18 (the first housing element 20).

An oil path 23a which is opened to the interior of the apparatus case 4 and an oil path 23b which communicates with the oil path 23a and which is opened to the annular space 27 are provided in the coil holder 23. The oil path 23a is formed to have an axis which is parallel to an axis of the coil holder 23, and the oil path 23b is formed to have an axis which is at right angles to the axis of the oil path 23a. A ball-shaped plug element 28 is mounted in the oil path 23b to prevent a leakage of lubricating oil to the outside of the coil holder 23. Additionally, an accommodating space 23c is provided in the coil holder 23 so as to be opened towards the rear housing 19.

The ball bearing 24 is restricted from moving in axial directions thereof by snap rings 29, 30 and is disposed in the annular space 27.

As shown in FIG. 6, three hole portions 18a to 18c are provided in the front housing 18, and the three hole portions 18a to 18c are opened towards the rear housing 19 and have bore diameters which are different from each other. A bore diameter of the hole portion 18a is set to a largest dimension (a largest bore diameter), a bore diameter of the hole portion 18b is set to a smallest dimension (a smallest bore diameter) and a bore diameter of the hole portion 18c is set to an intermediate dimension (an intermediate bore diameter) between the bore diameter of the hole portion 18a and the bore diameter of the hole portion 18b.

In these hole portions 18a to 18b, the hole portion 18b of the smallest bore diameter is formed by a first space portion 180b as an oil reserving space which has a uniform bore diameter in the direction of an axis thereof, a second space portion 181b whose bore diameter gradually increases from a side facing the first space portion 180b towards the hole portion 18c, and a third space portion 182b whose bore diameter gradually increases from the first space portion 180b towards the second space portion 181b. By adopting this configuration, a smallest bore diameter of the second space portion 181b is set to a dimension which coincides with a largest bore diameter of the third space portion 182b, and a smallest bore diameter of the third space portion 182b is set to a dimension which coincides with the bore diameter of the first space portion 180b. A portion of an inner circumferential surface of the hole portion 18b which forms the second space portion 181b is tapered so that its gradient becomes larger than a gradient of a portion which forms the third space portion 182b. The portions on the inner circumferential surface of the hole portion 18b which form the second space portion 181b and the third space portion 182b function as a pump forming portion.

The first housing element 20 has three body portions 20a to 20c which have different outside diameters, is disposed on an inner circumferential side of the front housing 18 and is formed of a shaft-shaped member of a magnetic material such as soft iron or the like as a whole. An outside diameter of the body portion 20a is set to a largest dimension (a largest outside diameter), an outside diameter of the body portion 20b is set to a smallest dimension (a smallest outside diameter), and an outside diameter of the body portion 20c is set to an intermediate dimension (an intermediate diameter) between the outside diameter of the body portion 20a and the outside diameter of the body portion 20b. The hole portion 18a is disposed inside the body portion 20a of the largest outside diameter, the hole portion 18b is disposed inside the body portion 20b of the smallest diameter, and the hole portion 18c is disposed inside the body portion 20c of the intermediate outside diameter.

The body portion 20a has an annular space 31 which is defined around an outer circumference thereof between the body portion 20a and an inner circumferential surface of the second housing element 21. Additionally, an oil path 200a is provided in the body portion 20a, and this oil path 200a is opened to the annular space 31 and the hole portion 18a. In addition, an oil path 201a is provided in the body portion 20a, and this oil path 201a is opened to the oil path 200a (the hole portion 18a in the front housing 18) and the accommodating space 23c.

The body portion 20b has a seal mechanism 32 which is disposed around an outer circumference thereof so as to be interposed between the body portion 20b and an inner circumferential surface of the coil holder 23. An oil path 200b is provided in the body portion 20b, and this oil path 200b makes up an oil inlet path A which is opened to the annular space 27 and the hole portion 18b and which enables the lubricating oil within the apparatus case 4 to be let into the first space portion 180b together with the oil paths 23a, 23b.

The body portion 20c has a needle roller bearing 33 which is disposed around an inner circumference thereof so as to be interposed between the body portion 20c and an outer circumferential surface f the inner shaft 13.

The second housing element 21 is disposed on an outer circumferential side of the front housing 18 and is formed, similarly to the first housing element 20, of a cylindrical member of a magnetic material such as soft iron or the like as a whole. A plurality of (four in this embodiment) engagement projecting portions 21a are provided on an outer circumferential surface of the second housing element 21 so as to project radially therefrom. The plurality of engagement projecting portions 21a are disposed at equal intervals in a circumferential direction of the second housing element 21.

An oil path 21b is provided in the second housing element 21, and this oil path 21 makes up an oil outlet path B together with the oil path 200a, the oil outlet path B being opened to an outer circumferential surface of the second housing element 21 and the annular space 31 and allowing the lubricating oil in the hole portion 18a to flow out into the oil accommodating chamber 43 in the apparatus case 4 (to the outside of the housing 12). Additionally, a pump forming portion 21d having the shape of a frustum of circular cone is provided integrally with the second housing element 21, and this pump forming portion 21d has an outer circumferential surface 21c which forms a pump between the inner circumferential surface of the coil holder 23 and itself. An annular space 21e is formed between the outer circumferential surface 21c of the pump forming portion 21d and the inner circumferential surface of the coil holder 23, and this annular space 21e allows the lubricating oil to flow from the side of the accommodating space 23c to the oil accommodating chamber 43.

The pump forming portion 21d is set to such a dimension that a dimension $r_1$ from an oil inlet side end portion 210d to the rotational axis O is smaller than a dimension $r_2$ from an oil outlet side end portion 211d to the rotational axis O ($r_1 < r_2$). Additionally, an outside diameter of the pump forming portion 21d is set to such a dimension that the outside diameter gradually increases from the oil inlet side end portion 210d towards the oil outlet side end portion 211d. Because of this, when the housing 12 rotates, a peripheral velocity of the outer circumferential surface 21c of the pump forming portion 21d gradually increases from the oil inlet side end portion 210d towards the oil outlet side end portion 211d, and therefore, a pressure in the annular space 21e gradually decreases from an oil inlet side towards an oil outlet side, whereby a pumping action exhibiting a suction force in a direction indicated by an arrow Z is generated between the outer circumferential surface 21c of the pump forming portion 21d and the inner circumferential surface of the coil holder 23. By the generated pumping action, the lubricating oil which flows into the accommodating space 23c in the coil holder 23 is let into the annular space 21e and thereafter flows through the annular space 21e to be let out into the oil accommodating chamber 43.

The third housing element 22 is disposed so as to be interposed between the first housing element 20 and the second housing element 21 and is formed, as a whole, of an annular member made of a non-magnetic material such as stainless steel or the like and adapted to connect the housing elements together.

The rear housing 19 has a straight spline fitting portion 19b which is exposed to the accommodating space 12a of the housing 12, is accommodated within the apparatus case 4 and is formed of a bottomless cylindrical member as a whole. Additionally, the rear housing 19 rotates about the rotational axis O together with the front housing 18. A flange 19c is provided on an outer circumferential surface of the rear housing 19 so as to project on a side which faces the coil holder 23. Additionally, a plurality of (four in this embodiment) engagement recess portions 19d, which are adapted to be brought into engagement with the engagement projecting portions 21a of the front housing 18 (the second housing element 21), are provided on the rear housing 19.

As shown in FIG. 7, the plurality of engagement recess portions 19d are formed by cutting a circumferential edge of an opening in the rear housing 19 on the side which faces the coil holder 23 (shown in FIG. 6) and part of the flange 19c at portions which are interposed between two adjacent splines of a plurality of splines 190b at the straight spline fitting portion 19b. A snap ring 34 is mounted on an outer circumferential surface of the rear housing 19 so as to be interposed between the flange 19c and the engagement projecting portions 21a.

(Configuration of the Inner Shaft 13)

The inner shaft 13 has three cylindrical portions 13a to 13c having outside diameters which are different from each other, a riser surface 13d which is interposed between the cylindrical portions 13a, 13b of the cylindrical portions 13a to 13c and a riser surface 13e which is interposed between the cylindrical portions 13a, 13c and is disposed on the rotational axis O of the housing 12. Part of the inner shaft 13 is accommodated in an interior of the housing 12, and a whole of the inner shaft 13 is formed of a bottomless cylindrical member which is opened axially at both sides thereof. An outside diameter of the cylindrical portion 13a is set to a largest dimension (a largest outside diameter), an outside diameter of the cylindrical portion 13b is set to a smallest dimension (a smallest outside diameter), and an outside diameter of the cylindrical portion 13c is set to an intermediate dimension (an intermediate outside diameter) between the outside diameter of the cylindrical portion 13a and the outside diameter of the cylindrical portion 13b. A distal end portion of the rear wheel axle shaft 213R (shown in FIG. 1) is inserted into an opening portion in the inner shaft 13 to be accommodated therein. The rear wheel axle shaft 213R is spline fitted in the inner shaft 13 in such a way as not to rotate relative to the inner shaft 13 but to move relative thereto.

The cylindrical portion 13a of the largest outside diameter is interposed between the cylindrical portion 13b of the smallest outside diameter and the cylindrical portion 13c of the intermediate outside diameter so as to be disposed axially centrally of the inner shaft 13. A flange 130a is provide integrally on an outer circumferential surface of the cylindrical portion 13a of the largest outside diameter so as to project in the hole portion 18a on a side which faces the front housing 18. An oil flow path 131a is provided in the flange 130a, and this oil flow path 131a is opened to both end faces of the flange 130a and allows the lubricating oil to flow between the oil inlet path A and the oil outlet path B.

Additionally, a straight spline fitting portion 132a is provided on the outer circumferential surface of the cylindrical portion 13a of the largest outside diameter, and this straight spline fitting portion 132a is exposed to the accommodating space 12a in the housing 12 and fits in the straight spline fitting portions 80a of the inner clutch plates 80 of the main clutch 8.

A cap-shaped plug element 35 is mounted in an inner circumferential surface of the cylindrical portion 13a of the largest outside diameter to prevent the lubricating oil in the apparatus case 4 from flowing out to the outside of the apparatus case 4. An oil path 133a is provided in the cylindrical portion 13a of the largest outside diameter so as to be opened to the inner and outer circumferential surfaces of the cylindrical portion 13a between the plug element 35 and the flange 130a.

The cylindrical portion 13b of the smallest outside diameter is disposed at one side (a left-hand side in FIG. 3) of the inner shaft 13 and is supported rotatably in the hole portion 18c of the front housing 18 via a needle roller bearing. A bottomed cylindrical shaft lid 36 is mounted in the cylindrical portion 13b of the smallest outside diameter so as to close an opening portion in the cylindrical portion 13b on a side thereof which faces the front housing 18.

A pump forming portion 36a having the shape of a frustum of circular cone is provided integrally on the shaft lid 36, and this pump forming portion 36a has an outer circumferential surface 360a which faces the portion on the inner circumferential surface of the hole portion 18b in the front housing 18 (the first housing element 20) where the second space portion 181b is formed and which forms a pump between the portions on the inner circumferential surface of the hole portion 18b where the second space portion 181b and the third space portion 182b are formed and itself. An annular space 37 is formed between the outer circumferential surface 360a of the pump forming portion 36a and an inner circumferential surface of the first housing element 20 so that the lubricating oil is let in from the side of the hole portion 18b (the first space portion 180b) to the hole portion 18c through the annular space 37 to thereby be supplied to the needle roller bearing 33 or the like. The annular space 37 is set to such a dimension that bore and outside diameters of the annular space 37 gradually increase from a side thereof where the lubricating oil is let in (an inlet side) towards a side thereof where the lubricating oil is let out (an outlet side).

The pump forming portion 36a is set to such a dimension that a dimension $R_1$ from an oil inlet side end portion 361a to the rotational axis O is smaller than a dimension $R_2$ from an oil outlet side end portion 362a to the rotational axis O ($R_1 < R_2$). Additionally, an outside diameter of the pump forming portion 36a is set to such a dimension that the outside diameter gradually increases from the oil inlet side end portion 361a towards the oil outlet side end portion 362a. Because of this, when the inner shaft 13 rotates, a peripheral velocity of the outer circumferential surface 360a of the pump forming portion 36a gradually increases from the oil inlet side end portion 361a towards the oil outlet side end portion 362a, and therefore, a pressure in the annular space 37 gradually decreases from an oil inlet side towards an oil outlet side, whereby a pumping action exhibiting a suction force in a direction indicated by an arrow Y is generated between the outer circumferential surface 360a of the pump forming portion 36a and the inner circumferential surface of the first housing element 20 (the portions where the second space portion 181b and the third space portion 182b are formed). By the generated pumping action, the lubricating oil which flows into the hole portion 18b (the first space portion 180b) in the front housing 18 is let into the second space portion 181b and the third space portion 182b (the annular space 37) and thereafter flows through the annular space 37 to be let out into the hole portion 18c.

The cylindrical portion 13c of the intermediate outside diameter is disposed on the other side (a right-hand side in FIG. 3) of the inner shaft 13 and is supported rotatably in the inner circumferential surface of the apparatus case 4 (the case lid member 41) via a ball bearing 38. A cylindrical bearing member 39 is mounted on an outer circumferential surface of the cylindrical portion 13c of the intermediate outside diameter so as to be interposed between the ball bearing 38 and the riser surface 13e. A seal mechanism 45 is disposed at a distal end portion of the cylindrical portion 13c of the intermediate outside diameter so as to be interposed between the outer circumferential surface thereof and an inner circumferential surface of the case lid member 41. Axial movements of the ball bearing 38 are restricted by snap rings 46, 47, and the ball bearing 38 is disposed so as to be interposed between the outer circumferential surface of the cylindrical portion 13c of the intermediate outside diameter and the inner circumferential surface of the case lid member 41.

(Configuration of the Electromagnetic Clutch 9)

The electromagnetic clutch 9 has an electromagnetic coil 90 and an armature 91 and is disposed so as to be aligned with the main clutch 8 on the rotational axis O of the housing 12. Then, the electromagnetic clutch 9 actuates the first cam mechanism 15 by the armature 91 moving towards the electromagnetic coil 90 as a result of an electromagnetic force F being generated when the housing 12 rotates, whereby the inner clutch plates 80 and the outer clutch plates 81 of the main clutch 8 are brought into friction engagement with each other.

The electromagnetic coil 90 is connected to an ECU of the vehicle and is held within the coil holder 23 via a bobbin 90a. Then, when energized, the electromagnetic coil 90 forms a magnetic circuit M over the coil holder 23, the front housing 18, the pilot clutch 10 and the armature 91 and generates an electromagnetic force F by which a moving force is imparted to the armature 91 to move it towards the front housing 18.

The armature 91 has a straight spline fitting portion 91a on an outer circumferential surface thereof and is connected the rear housing 19 in such a way as not to rotate relative to the rear housing 19 but to move relative thereto through fitting of the straight spline fitting portion 91a in the straight spline fitting portion 19b. The armature 91 is disposed so as to be interposed between the first cam mechanism 15 (the main cam 151) and the pilot clutch 10 and is accommodated in the accommodating space 12a in the housing 12, and the armature 91 is formed of an annular plate of a magnetic material such as iron or the like as a whole. Additionally, the armature 91 receives the electromagnetic force F of the electromagnetic coil 90 to move towards the front housing 18 along the rotational axis O.

(Configuration of the Pilot Clutch 10)

The pilot clutch 10 has inner clutch plates 100 and outer clutch plates 101 which are made up of annular frictional plates which can be brought into friction engagement with each other by the armature 91 moving towards the electric coil 90 as a result of the electromagnetic clutch 9 being energized, is disposed between the armature 91 and the front housing 18 and is accommodated in the accommodating space 12a in the housing 12. Additionally, the pilot clutch 10 disconnectably connects the rear housing 19 and the first cam mechanism 15 (a pilot cam 150) to each other by bringing adjacent clutch plates of the inner clutch plates 100 and the outer clutch plates 101 into friction engagement with each other and releasing the friction engagement between the adjacent clutch plates.

The inner clutch plates 100 and the outer clutch plates 101 are disposed alternately along the rotational axis O and are formed into an annular friction plate as a whole.

The inner clutch plate 100 has a straight spline fitting portion 100a on an inner circumferential portion thereof and is connected to the pilot cam 150 in such a manner as not to rotate relative to the pilot cam 150 but to move relative thereto by the straight spline fitting portion 100a being fitted on a straight spline fitting portion 150a.

The outer clutch plate 101 has a straight spline fitting portion 101a on an outer circumferential portion thereof and is connected to the rear housing 19 in such a way as not to rotate relative to the rear housing 19 but to move relative thereto by the straight spline fitting portion 101a being fitted in the straight spline fitting portion 19b.

(Configuration of the First Cam Mechanism 15)

The first cam mechanism 15 has the input ball cam member (the pilot cam) 150 which receives a rotational force from the housing 12 (the rear housing 19) to rotate, the output ball cam member (the main cam) 151 which is aligned with the pilot cam 150 along the rotational axis O, and a plurality of (six in this embodiment) spherical cam followers 152 which are interposed between the main cam 151 and the pilot cam 150, is disposed between the main clutch 8 and the front housing 18 and is accommodated in the accommodating space 12a in the housing 12. Additionally, the first cam mechanism 15 transforms a rotational force which the first cam mechanism 15 receives from the housing 12 as a result of the electromagnetic clutch 9 performing a clutching operation into a pressing force (a first cam thrust) $P_1$ which constitutes a clutching force (a frictional engagement force) of the main clutch 8.

The pilot cam 150 has a straight spline fitting portion 150a which fits in the straight spline fitting portions 100a of the inner plate clutches 100 on an outer circumferential portion thereof, is supported rotatably at the flange 130a of the inner shaft 13 (the cylindrical portion 13a) via a needle roller bearing 153, and is formed by an annular member through which the inner shaft 13 is inserted as a whole. In addition, the pilot cam 150 generates the first cam thrust $P_1$ between the main cam 151 and itself to output it to the main clutch 8.

A plurality of (six in this embodiment) cam grooves 150b are provided in the pilot cam 150 so as not only to be aligned side by side in a circumferential direction thereof but also to be opened to the cam followers 152. The plurality of cam grooves 150b are disposed at equal intervals in the circumferential direction of the pilot cam 150. Additionally, the plurality of cam grooves 150b are formed by concave grooves whose axial depth becomes shallower from a neutral position thereof along the circumferential direction of the pilot cam 150.

The main cam 151 has a clutch plate pressing portion 151a on a side thereof which faces the main clutch 8, is disposed along the rotational axis O so as to move relative to the inner shaft 13 (the cylindrical portion 13a of the largest outside diameter) and is formed of an annular member through which the inner shaft 13 is inserted as a whole. Additionally, with the electromagnetic coil 90 energized, the main cam 151 moves towards the main clutch 8 as a result of a cam action of the first cam mechanism 15, that is, as a result of receiving the first cam thrust $P_1$ generated by the rotation of the pilot cam 150 from the cam followers 152 to thereby press the clutch plate pressing portion 151a against the inner clutch plate 80 at an input side of the main clutch 8 on one side (a left-hand side in FIG. 3) of the rotational axis O.

A plurality of (six in this embodiment) cam grooves 151b are provided in the main cam 151 so as not only to be aligned at equal intervals in a circumferential direction thereof but also to be opened to the cam followers 152. Additionally, the plurality of cam grooves 151b are formed by concave grooves whose axial depth becomes shallower from a neutral position thereof along the circumferential direction of the main cam 151. In addition, a plurality of (six in this embodiment) oil holes 151c, which are opened in a direction parallel to the rotational axis, and a plurality of (six in this embodiment) pin mounting holes 151d, which are opened in an opposite direction to the direction in which the plurality of cam grooves 151b are opened, are provided in the main cam 151. The plurality of oil holes 151c and the plurality of pin mounting holes 151d are disposed alternately at equal intervals in the circumferential direction of the main cam 151.

Guide pins 155 which guide return springs 154 interposed between the main cam 151 and a pressing member 162 (an output cam member 161 of the second cam mechanism 16) are mounted in the pin mounting holes 151d. By adopting this configuration, spring forces of the return springs 154 act in a direction in which the main cam 151 and the output cam member 161 move away from each other, and the clearances between the adjacent clutch plates of the inner clutch plates 80 and the outer clutch plates 81 are set to such a dimension that the clutch plates are not brought into friction engagement with each other even though drag torque is generated therebetween based on the viscosity of the lubricating oil when the four-wheel drive vehicle 200 (shown in FIG. 1) travels forwards in the two-wheel drive mode.

The cam followers 152 are disposed so as to be interposed between the cam grooves 150b of the pilot cam 150 and the cam grooves 151b of the main cam 151 and are retained rollingly by a retainer (not shown).

(Configuration of the Second Cam Mechanism 16)

As shown in FIGS. 2 to 4, the second cam mechanism 16 has an input cam member 160 which receives a rotational force which constitutes an operation force thereof from the drive source 5 to rotate and the output cam member 161 which is aligned with the input cam member 160 on the rotational axis O and is disposed in a position where the second cam mechanism 16 faces the first cam mechanism 15 via the main clutch 8 on the rotational axis O. Additionally, the second cam mechanism 16 operates before the first cam mechanism 15 transforms the rotational force into the first cam thrust $P_1$ to generate a second cam thrust $P_2$ which presses the pressing member 162 against the main clutch 8 to reduce the clearances C between the inner clutch plates 80 and the outer clutch plates 81 to, for example, C=0 along an opposite direction to the direction of the first thrust $P_1$ between the input cam member 160 and the output cam member 161.

The input cam member 160 is connected to the transmission member 54 via the gear transmission mechanism 56, is supported rotatably by the bearing member 39 via a needle roller bearing 164, and is formed of an annular member through which the inner shaft 13 is inserted as a whole. A sectorial projecting piece 167 is provided integrally with the input cam member 160 so as to project along an outer circumferential edge of the input cam member 160. An external gear 167a is provided on the projecting piece 167 so as to mesh with the external gear 540a of the transmission member 54.

The output cam member 161 is disposed so as to be interposed between the input cam member 160 and the output cam member 162 while allowed to move axially (but not allowed to move circumferentially) and is formed of an annular member through which the inner shaft 13 is inserted as a whole.

The pressing member 162 has a straight spline fitting portion 162a on an inner circumferential edge thereof and has a clutch plate pressing portion 162b on a side which faces the main clutch 8. The pressing member 162 is connected to the inner shaft 13 so as not to rotate relative to the inner shaft 13 but to move relative thereto by fitting the straight spline fitting portion 162a on the straight spline fitting portion 132a of the inner shaft 13 (the cylindrical portion 13a), is supported rotatably by the output cam member 161 via a needle roller bearing 171, and is formed of an annular member through which the inner shaft 13 is inserted as a whole.

Additionally, when receiving the second cam thrust $P_2$ which is generated by the operation of the second cam mechanism 16 from the output cam member 161, the pressing member 162 moves towards the main clutch 8 to thereby press the clutch plate pressing portion 162b against the outer clutch plate 81 at the input side of the main clutch 8 on the other side (a right-hand side in FIG. 3) of the rotational axis O.

(Operation of the Driving Force Transmission Apparatus 1)

Next, the operation of the driving force transmission apparatus described in this embodiment will be described by the use of FIGS. 1, 3, 4, 6 and 7.

In FIG. 1, when the engine 202 of the four-wheel drive vehicle 200 is started, the rotational driving force of the engine 202 is transmitted to the front differential 206 via the transmission 203 and is further transmitted from the front differential 206 to the front wheels 204L, 204R via the front wheel axle shafts 208L, 208R, whereby the front wheels 204L, 204R are driven to rotate.

As this occurs, in the driving force connection and disconnection apparatus 3, the drive cannot be transmitted between the first spline portion 3a and the second spline portion 3b. Additionally, when the four-wheel drive vehicle 200 stops or runs constantly, as shown in (the upper half portion of) FIG. 3, the electromagnetic coil 90 of the magnetic clutch 9 is not energized, and therefore, the magnetic circuit M originating from the electromagnetic coil 90 is not formed, and the armature 91 moves towards the electromagnetic coil 90 and is never connected to the housing 12.

Because of this, the first cam thrust $P_1$ which constitutes the clutching force (the frictional engagement force) of the main clutch 8 is not generated in the first cam mechanism 15, and the inner clutch plates 80 and the outer clutch plates 81 of the main clutch 8 are not brought into friction engagement with each other, whereby the rotational driving force of the engine 202 is not transmitted from the housing 12 to the inner shaft 13.

Here, the pump action by the pump forming portion 21d and the oil flow S of lubricating oil which are generated in association with the four-wheel drive vehicle 200 traveling forwards in the two-wheel drive mode will be described. It is noted that the description of the pump action by the pump forming portion 36a will be omitted. As shown in FIG. 5(a), when the four-wheel drive vehicle 200 travels forwards in the two-wheel drive mode, the housing 12 rotates in a direction indicated by an arrow $Q_1$ by the rotation of the rear wheel 205L. As this occurs, a pump action exhibiting a suction force in a direction indicated by an arrow Z (shown in FIG. 6) is generated between the outer circumferential surface 21c of the pump forming portion 21d and the inner circumferential surface of the coil holder 23 by the rotation of the housing 12.

This causes the lubricating oil in the accommodating space 12a in the housing 12 to flow into the oil path 201a (shown in FIG. 6), and the lubricating oil flows through the oil path 201a to flow into the accommodating space 23c (shown in FIG. 6).

Next, the lubricating oil which flows into the accommodating space 23c is let into the annular space 21e and thereafter flows through the annular space 21e to be let out into the oil accommodating chamber 43.

Then, the lubricating oil which is let out into the oil accommodating chamber 43 bears a centrifugal force generated in association with the rotation of the housing 12 and forms the oil flow S which follows the inner circumferential surface 40b of the case main body 40. This causes the lubricating oil to flow along the inner circumferential surface 40b of the case main body 40, and a portion of the lubricating oil flows into the first tank portion 44a of the tank 44 from the oil inlet port 441a thereof, while a portion of the lubricating oil flows into the second tank portion 44b from the oil inlet port 441b (shown in FIG. 4) thereof, whereby the lubricating oil is reserved in the first tank portion 44a and the second tank portion 44b.

As this occurs, since the opening area of the oil outlet port 442b is set to the area which is smaller than the opening area of the oil inlet port 441a of the first tank portion 44a, the amount of lubricating oil which flows into the tank 44 (the first tank portion 44a) from the oil inlet port 441a becomes larger than the amount of lubricating oil which flows out of the tank 44 (the second tank portion 44b) from the oil outlet port 442b, whereby the lubricating oil tends to be reserved accordingly in the tank 44 (in the first tank portion 44a and the second tank portion 44b).

Consequently, in this embodiment, the amount of the lubricating oil in the accommodating space 12a and the oil accommodating chamber 43 is reduced when the four-wheel drive vehicle travels forwards in the two-wheel drive mode, whereby the generation of drag torque between the inner clutch plates 80 and the outer clutch plates 81 is suppressed.

On the other hand, in order for the four-wheel drive vehicle 200 in the two-wheel drive mode to be switched to the four-wheel drive mode, the propeller shaft 2 and the rear wheel axle shaft 213R are connected together so that torque can be transmitted therebetween by the driving force transmission apparatus 1, while the front differential case 212 and the propeller shaft 2 are kept connected together so that torque can be transmitted therebetween by the driving force connection and disconnection apparatus 3.

Here, when the propeller shaft 2 is connected to the rear wheel axle shafts 213L, 213R, firstly, the driving force of the drive source 5 is imparted to the second cam mechanism 16 to actuate the second cam mechanism 16. As this occurs, when the second cam mechanism 16 is actuated, the input cam member 160 rotates about the rotational axis O.

This causes the input cam member 160 and the output cam member 161 to rotate relative to each other, and a cam action is generated between the cam members 160, 161. In association with this, the second cam thrust $P_2$ is exerted on the output cam member 161 from the input cam member 160. As shown in FIG. 3, this causes the output cam member 161 to move along the rotational axis O in the direction in which the output cam member 161 moves away from the input cam member 160.

Then, as a result of the output cam member 161 moving in the direction in which the output cam member 161 moves away from the input cam member 160, the pressing member 162 is moved towards the main clutch 8 against the spring forces of the return springs 154, whereby the pressing member 162 presses the main clutch 8 towards the first cam mechanism 15 by the clutch plate pressing portion 162b to move the main clutch 8. This reduces the clearance C between any two adjacent clutch plates of the inner clutch plates 80 and the outer clutch plates 81 to, for example, C=0.

Next, when the electromagnetic coil 90 is energized, the magnetic circuit M originating from the electromagnetic coil 90 is formed over the coil holder 23, the front housing 18, the pilot clutch 10 and the armature 91 and the like, whereby the armature 91 is caused to move towards the front housing 18 by the electromagnetic force F (the suction force) which is generated based on the energization of the electromagnetic coil 90. Because of this, the armature 91 is connected to the front housing 18 via the pilot clutch 10, and further, the rotational force of the housing 12 is transmitted to the pilot cam 150 by the clutch operation of the pilot clutch 10, whereby the pilot cam 150 rotates.

In association with the rotation of the pilot cam 150, the first cam mechanism 15 operates, and the rotational force is transformed into the first cam thrust $P_1$ which constitutes the clutching force (the frictional engagement force) of the main clutch 8 by the cam action generated in the first cam mechanism 15, whereby this first cam thrust $P_1$ causes the main cam 151 to move against the spring forces of the return springs 154 in the direction in which the clutch plates 80, 81 of the main clutch 8 are brought into friction engagement with each other.

Then, as a result of the main cam 151 moving in the direction in which the clutch plates 80, 81 are brought into friction engagement with each other, the main clutch 8 is pressed towards the second cam mechanism 16 by the clutch plate pressing portion 151a.

This brings the two adjacent clutch plates of the inner clutch plates 80 and the outer clutch plates 81 into friction engagement with each other, and the rotational driving force of the engine 202 is transmitted from the housing 12 to the inner shaft 13 and is further transmitted from the inner shaft 13 to the rear wheels 205L, 205R via the rear wheel axle shafts 213L, 213R, whereby the rear wheels 205L, 205R are driven to rotate.

Next, the pump action by the pump forming portion 21d and the oil flow T of lubricating oil which are generated in association with the four-wheel drive vehicle 200 traveling forwards in the four-wheel drive mode will be described. It is noted that the description of the pump action by the pump forming portion 36a will be omitted. As shown in FIG. 7, when the four-wheel drive vehicle 200 travels forwards in the four-wheel drive mode, the housing 12 rotates in a direction indicated by an arrow $Q_2$ (in an opposite direction to the direction indicated by the arrow $Q_1$) by the drive of the engine 202. As this occurs, as with the case where the four-wheel drive vehicle 200 travels forwards in the two-wheel drive mode, a pump action exhibiting a suction force in a direction indicated by an arrow Z (shown in FIG. 4) is generated between the outer circumferential surface 21c of the pump forming portion 21d and the inner circumferential surface of the coil holder 23 by the rotation of the housing 12.

This causes the lubricating oil in the accommodating space 12a in the housing 12 to flow into the oil path 201a (shown in FIG. 6), and the lubricating oil flows through the oil path 201a to flow into the accommodating space 23c (shown in FIG. 6).

Next, the lubricating oil which flows into the accommodating space 23c is let into the annular space 21e and thereafter flows through the annular space 21e to be let out into the oil accommodating chamber 43.

Then, the lubricating oil which is let out into the oil accommodating chamber 43 bears a centrifugal force generated in association with the rotation of the housing 12 and forms the oil flow T which follows the inner circumferential surface 40b of the case main body 40. This causes the lubricating oil to flow along the inner circumferential surface 40b of the case main body 40.

As this occurs, since the oil outlet port 442b is opened along the direction which intersects the direction of the oil flow T, a smooth introduction of lubricating oil from the oil outlet port 442b into the tank 44 is made difficult when the four-wheel drive vehicle 200 travels forwards in the four-wheel drive mode, whereby a sufficient amount of lubricating oil is reserved in the accommodating space 12a and the oil accommodating chamber 43. The angle (the minor angle) $\theta_1$ which is formed by the inner surface 443B to which the oil outlet port 442b is opened and the tangent d to the inner circumferential surface 40b of the accommodating portion 40c is set to the angle which is larger than the angle (the minor angle) $\theta_2$ (in this embodiment, the inner surface 442A coincides with the tangent b, $\theta_2=0°$. $\theta_2$ is not shown) which is formed by the inner surface 442A of the oil inlet port 441a and the tangent b to the inner circumferential surface 40b of the accommodating portion 40c ($\theta_2<\theta_1$). Therefore, a smooth introduction of the lubricating oil from the oil outlet port 442b into the interior of the tank 44 is made difficult when the four-wheel drive vehicle 200 travels forwards in the four-wheel drive mode, whereby a sufficient amount of lubricating oil is reserved in the accommodating space 12a and the oil accommodating chamber 43.

[Advantage of the First Embodiment]

The following advantages can be obtained according to the first embodiment that has been described heretofore.

(1) The amount of lubricating oil in the accommodating space 12a and the oil accommodating chamber 43 is reduced when the four-wheel drive vehicle 200 travels forwards in the two-wheel drive mode, thereby making it possible to reduce the drag torque, and the response to the clutching operation in the main clutch 8 can be enhanced when the four-wheel drive vehicle 200 is shifted from the two-wheel drive mode to the four-wheel drive mode.

(2) The sufficient amount of lubricating oil can be reserved in the oil accommodating chamber 43 when the four-wheel drive vehicle 200 travels forwards in the four-wheel drive mode, and therefore, the damage can be suppressed which would otherwise be caused due to the heat generated in the clutch plates when the inner clutch plates 80 and the outer clutch plates 81 of the main clutch 8 are brought into friction engagement with each other.

(3) The lubricating oil in the accommodating space 12a can be let out into the oil accommodating chamber 43 by the pump action of the pump forming portion 21d when the housing 12 rotates while the four-wheel drive vehicle 200 is traveling forwards in the four-wheel drive mode.

Second Embodiment

Next, a driving force transmission apparatus according to a second embodiment of the invention will be described by the use of FIGS. 8 to 17. In FIGS. 8 to 17, like reference numerals will be given to like or similar members to those depicted in FIGS. 2 to 7 and a detailed description thereof will be omitted here.

(Overall Configuration of the Driving Force Transmission Apparatus 1)

Figure 8:
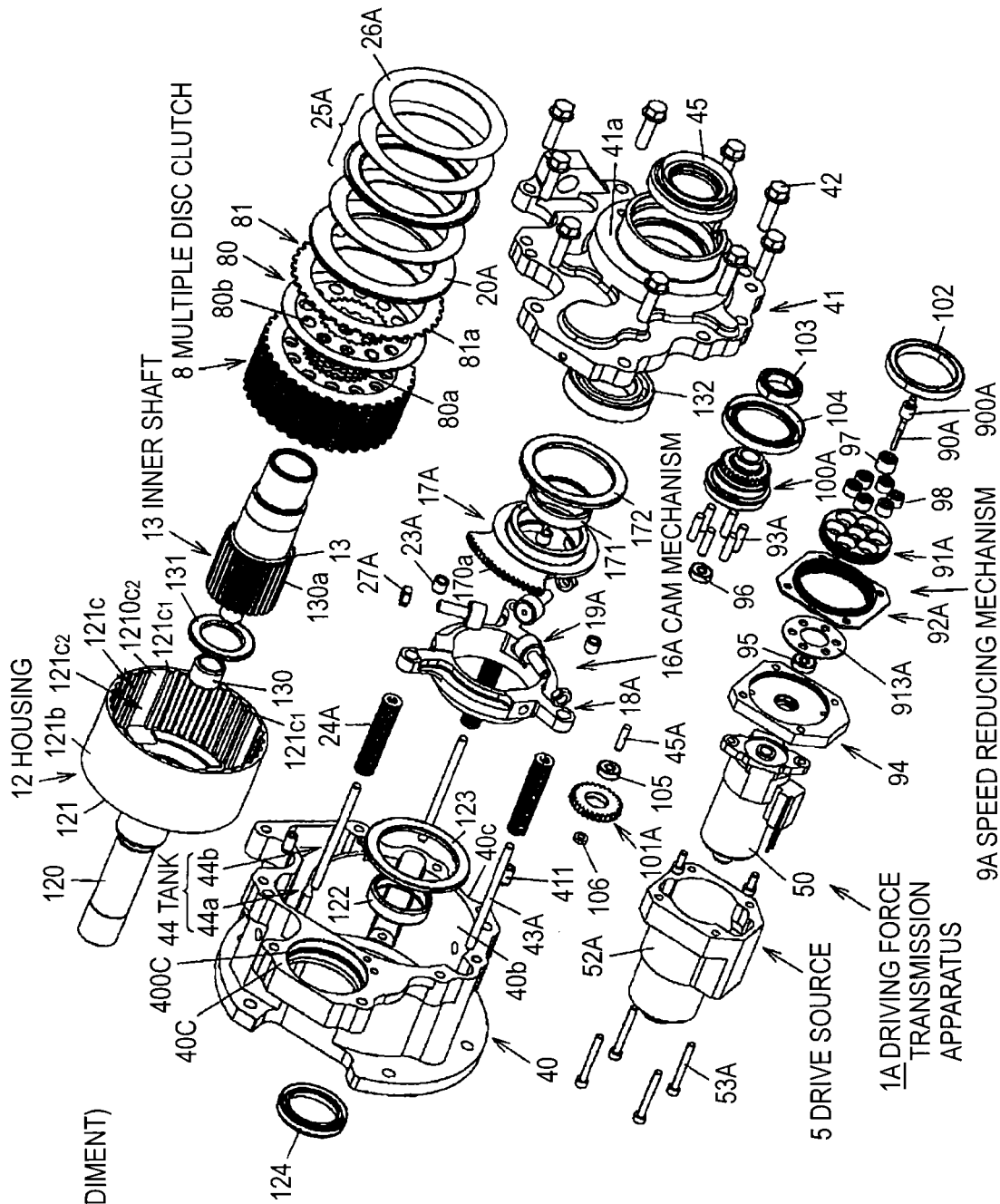
FIG. 8 is an exploded perspective view depicting a whole of a driving force transmission apparatus according to a second embodiment of the invention.
Figure 9:
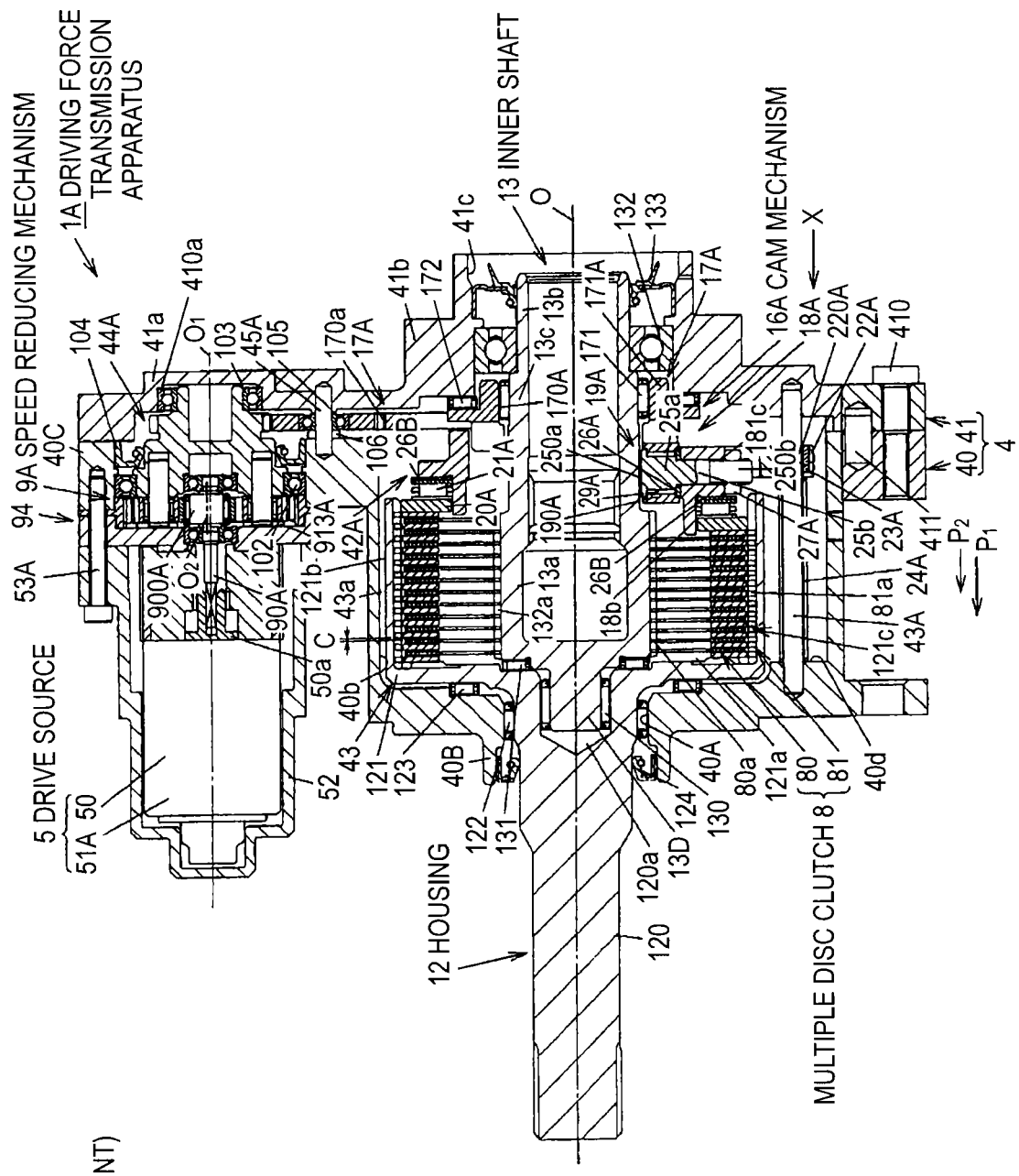
FIG. 9 is a sectional view depicting a whole of the driving force transmission apparatus according to the second embodiment of the invention.
Figure 10:
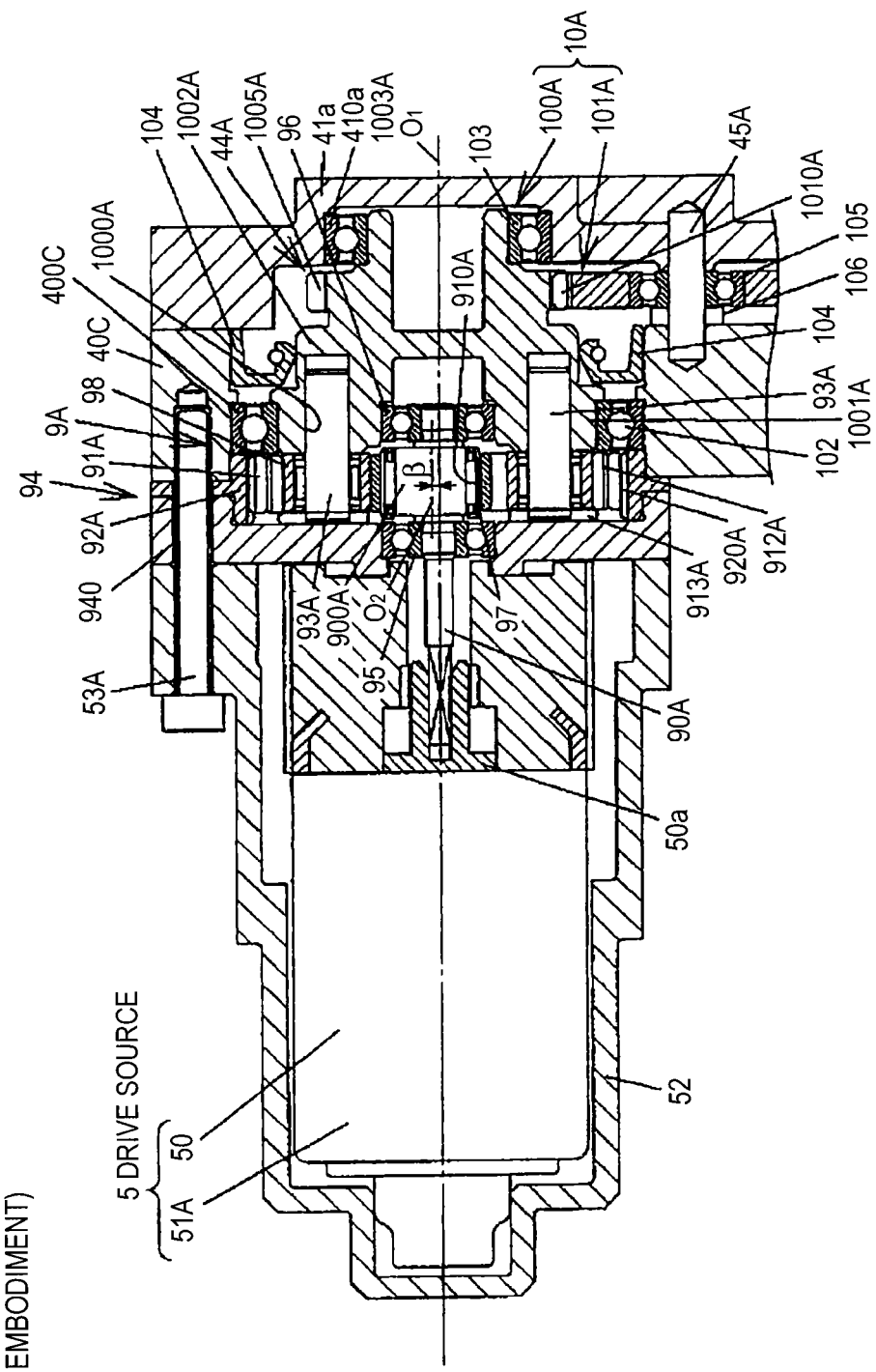
FIG. 10 is an enlarged sectional view depicting an auxiliary drive source and a speed reducing mechanism of the driving force transmission apparatus according to the second embodiment of the invention.
Figure 11:
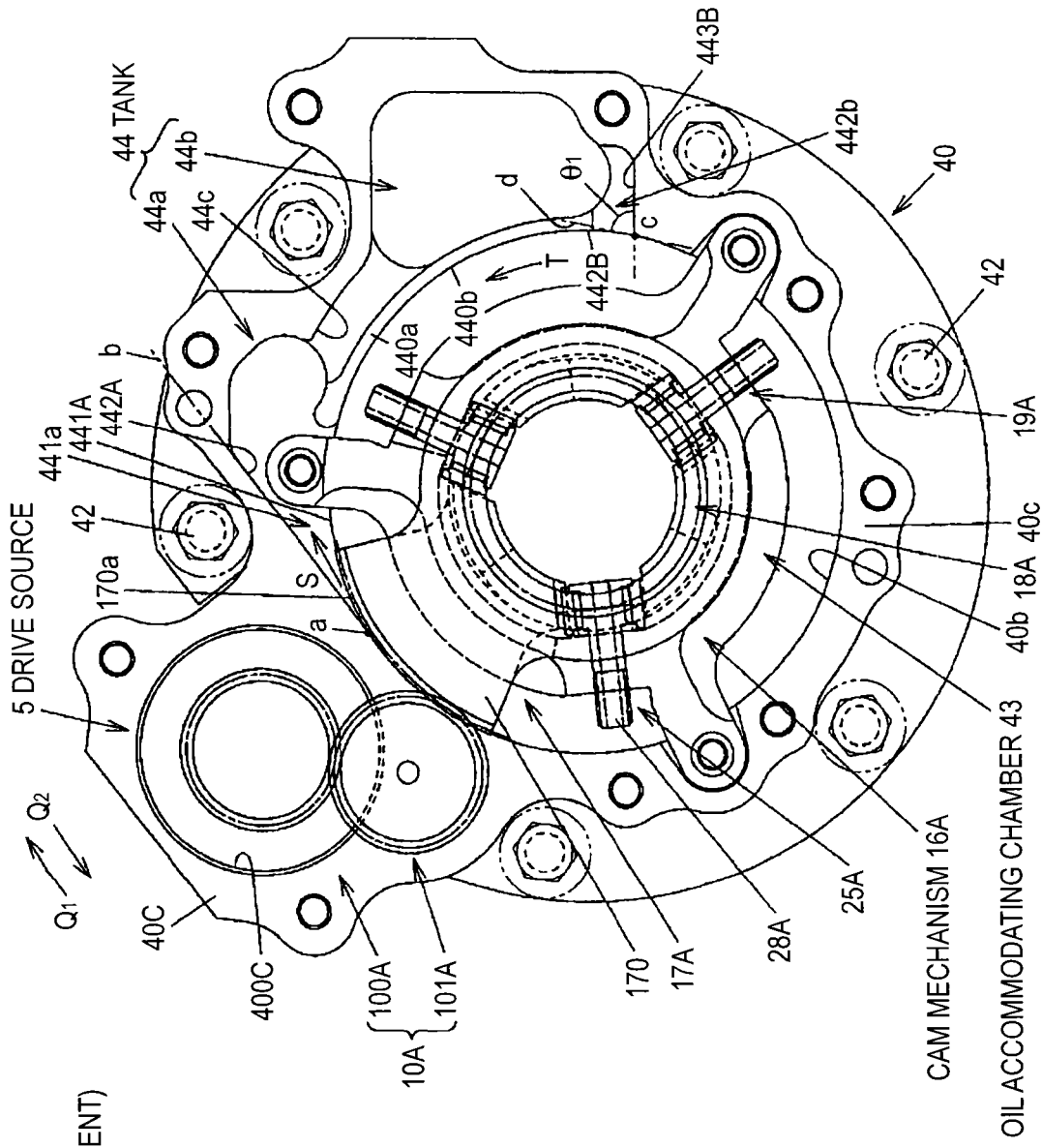
FIG. 11 is a front view depicting oil flows of lubricating oil generated in a tank of the driving force transmission apparatus according to the second embodiment of the invention when a four-wheel drive vehicle travels forwards in a four-wheel drive mode and travels forwards in a two-wheel drive mode.

FIGS. 8 and 9 show a whole of a driving force transmission apparatus. FIG. 10 shows a main part of the driving force transmission apparatus. FIG. 11 shows a tank. As shown in FIGS. 8 to 11, a driving force transmission apparatus 1A has a multiple disc clutch 8, a housing 12 as a first rotational member, an inner shaft 13 as a second rotational member, and a cam mechanism 16A, is disposed on a rear wheel 205R (shown in FIG. 1) side of a four-wheel drive vehicle 200 (shown in FIG. 1), and is accommodated within an apparatus case 4.

In addition, the driving force transmission apparatus 1A disconnectably connects a propeller shaft 2 (shown in FIG. 1) and a rear wheel axle shaft 213R (shown in FIG. 1) to each other. Namely, the rear wheel axle shaft 213R and the propeller shaft 2 are connected together via the driving force transmission apparatus 1. A rear wheel axle shaft 213L (shown in FIG. 1) and the propeller shaft 2 are connected together without the interposition of the driving force transmission apparatus 1 therebetween.

By adopting this configuration, when the propeller shaft 2 and the rear wheel axle shaft 213R are connected together by the driving force transmission apparatus 1A, the rear wheel axle shaft 213L and the propeller shaft 2 are connected together so that torque can be transmitted therebetween via a gear mechanism 7 and a rear differential 207 (both of which are shown in FIG. 1), while the other rear wheel axle shaft 213R and the propeller shaft 2 are connected together so that torque can be transmitted therebetween via the gear mechanism 7 and the rear differential 207. On the other hand, when the connection between the propeller shaft 2 and the rear wheel axle shaft 213R by the driving force transmission apparatus 1 is released, although the rear wheel axle shaft 213L and the propeller shaft 2 are kept connected via the gear mechanism 7 and the rear differential 207, the connection between the other rear wheel axle shaft 213R and the propeller shaft 2 is interrupted.

The apparatus case 4 has a case main body 40 which is opened to one side (a right-hand side in FIG. 9) of a rotational axis O and a case lid member 41 which closes an opening portion of the case main body 40 and is mounted on a vehicle body of the four-wheel drive vehicle 200. A main accommodating space 42A is formed in the apparatus case 4, and this main accommodating space 42A includes an oil accommodating chamber 43 and accommodates the cam mechanism 16A and the multiple disc clutch 8.

The case main body 40 has an accommodating portion 40c, a mounting portion 40C and a tank 44 as a tank portion.

The accommodating portion 40c is formed of a substantially cylindrical member having an inner circumferential surface 40b which faces an outer circumferential surface 121b of a second housing element 121. An element insertion hole 40A through which a first housing element 120 of the housing 12 is inserted and a cylindrical portion 40B which projects axially from an outer circumferential edge of an opening in the element insertion hole 40A are provided in and on the accommodating portion 40c. A plurality of (three in this embodiment) guides (fixing guides) 43A which are made up of round pins and which have axes parallel to a rotational shaft 90A (a rotational axis O) are mounted on the case main body 40 and the case lid member 41. The plurality of guides 43A are disposed at equal intervals around the rotational axis O. An annular space 43a is provided in the case main body 40 as to be interposed between the inner circumferential surface 40b of the accommodating portion 40c and the outer circumferential surface 121b of the second housing element 121. An oil accommodating chamber 43, which communicates with an accommodating space 121a in the housing 12, is provided in the case main body 40.

The mounting portion 40C is provided integrally with the accommodating portion 40c so as to project radially outwards of the accommodating portion 40c. A cam operating drive source 5 (shown in FIG. 8) which is different from the engine 202 (shown in FIG. 1) is mounted on the mounting portion 40C. A through hole 400C is provided in the mounting portion 40C, and this through hole 400C is opened in an axial direction which is parallel to the rotational axis O.

Referring to FIGS. 8, 9 and 11, the tank 44 is disposed radially outwards of the accommodating portion 40c and outside the oil accommodating chamber 43. The tank 44 is provided integrally with the accommodating portion 40c. The tank 44 has a first tank portion 44a and a second tank portion 44b. The tank 44 can reserve lubricating oil in the oil accommodating chamber 43 and the accommodating space 121a.

The first tank portion 44a is disposed on an upstream side of the second tank portion 44b in an oil flow S of lubricating oil (on a left-hand side of the tank 44 in FIG. 11) which is formed as the housing 12 rotates in a direction indicated by an arrow $Q_1$ when the four-wheel drive vehicle 200 (shown in FIG. 1) travels forwards in a two-wheel drive mode and is formed by a bulkhead 440a which makes up part of the inner circumferential surface 40b of the accommodating portion 40c and an external wall of the apparatus case 4.

An oil inlet port 441a is provided in the first tank portion 44a, and this oil inlet port 441a functions as a flow port at an upstream side of the first tank portion 44a and allows lubricating oil in the oil accommodating chamber 43 to be let in therethrough when the four-wheel drive vehicle 200 travels forwards in the two-wheel drive mode.

The oil inlet port 441a is opened to the inner circumferential surface 40b of the accommodating portion 40c. Assuming that a flow of lubricating oil which is formed as the housing 12 rotates when the four-wheel drive vehicle 200 travels forwards in the two-wheel drive mode is referred to as the oil flow S and that a position of a portion where an opening surface (an imaginary circumferential surface) 441A intersects the inner circumferential surface 40b which lies on an upstream side of the oil flow S is referred to as a point of intersection a, the oil inlet port 441a has an inner surface 442A which contains a tangent b to the inner circumferential surface 40b which passes through the point of intersection a. The oil inlet port 441a is opened, in a circumferential direction of the housing 12, in the first tank portion 44a in an opposite direction to a direction in which the housing 12 rotates when the four-wheel drive vehicle 200 travels forwards in the two-wheel drive mode. The oil inlet port 441a is opened, in the circumferential direction of the housing 12, in the first tank portion 44a in a direction in which the inner shaft 13 rotates when the four-wheel drive vehicle 200 travels forwards in the two-wheel drive mode. The oil inlet port 441a is opened, in the circumferential direction of the housing 12, to the upstream side of the oil flow S of lubricating oil as viewed from an interior of the first tank portion 44a. The oil inlet port 441a is opened along the direction of the oil flow S of lubricating oil which is formed as the housing 12 rotates when the four-wheel drive vehicle 200 travels forwards in the two-wheel drive mode (along the inner circumferential surface 40b of the case main body 40). By adopting this configuration, a smooth introduction of the lubricating oil from the oil inlet port 441a into the interior of the first tank portion 44a is effected when the four-wheel drive vehicle 200 (show in FIG. 1) travels forwards in the two-wheel drive mode.

The oil inlet port 441a is opened, in the circumferential direction of the housing 12, in the first tank portion 44a in a direction in which the housing 12 rotates when the four-wheel drive vehicle 200 travels forwards in a four-wheel drive mode. The oil inlet port 441a is opened, in the circumferential direction of the housing 12, in the first tank portion 44a in a direction in which the inner shaft 13 rotates when the four-wheel drive vehicle 200 travels forwards in the four-wheel drive mode. The oil inlet port 441a is opened, in the circumferential direction of the housing 12, in the first tank portion 44a at a downstream side of an oil flow T of lubricating oil as viewed from the interior of the first tank portion 44a. The oil inlet port 441a is opened in a direction which intersects a direction of the oil flow T of lubricating oil which is formed as the housing 12 rotates when the four-wheel drive vehicle 200 travels forwards in the four-wheel drive mode. By adopting this configuration, a smooth introduction of the lubricating oil from the oil inlet port 441a into the interior of the first tank portion 44a is made difficult when the four-wheel drive vehicle 200 travels forwards in the four-wheel drive mode.

The second tank portion 44b is disposed at a downstream side (in a right side of the tank 44 in FIG. 11) of the first tank portion 44a in the oil flow S and is formed, similarly to the first tank portion 44a, by a bulkhead 440b which makes up part of the inner circumferential surface 40b of the accommodating portion 40c and the external wall of the apparatus case 4. An internal capacity of the second tank portion 44b is set to a capacity which is larger than an internal capacity of the first tank portion 44a.

In addition, an oil outlet port 442b is provided in the second tank portion 44b, and this oil outlet port 442b functions as a flow part at a downstream side and is opened along a direction which intersects the direction of the oil flow S.

The oil outlet port 442b is opened to the inner circumferential surface 40b of the accommodating portion 40c. Assuming that a position of a portion where an opening surface (an imaginary circumferential surface) 442B intersects the inner circumferential surface 40b which lies on an upstream side of the oil flow T is referred to as a point of intersection c, the oil outlet port 442b has an inner surface 443B which intersects a tangent d to the inner circumferential surface 40b which passes through the point of intersection c. The oil outlet port 442b resides at an opposite side to the first tank portion 44a as viewed from the tank portion 44b. The oil outlet port 442b is opened, in the circumferential direction of the housing 12, in the second tank portion 44b in a direction in which the housing 12 rotates when the four-wheel drive vehicle 200 travels forwards in the two-wheel drive mode. The oil outlet port 442b is opened, in the circumferential direction of the housing 12, in the second tank portion 44b in an opposite direction to a direction in which the housing 12 rotates when the four-wheel drive vehicle 200 travels forwards in the four-wheel drive mode. By adopting this configuration, a smooth introduction of the lubricating oil from the oil outlet port 442b into an interior of the second tank portion 44b is made difficult when the four-wheel drive vehicle 200 travels forwards in the two-wheel drive mode.

Since the oil outlet port 442b is also opened in a direction which interests the direction of the oil flow T, a smooth introduction of the lubricating oil from the oil outlet port 442b into the interior of the tank 44 is made difficult when the four-wheel drive vehicle 200 travels forwards in the four-wheel drive mode, whereby a sufficient amount of lubricating oil is reserved in the accommodating space 12a and the oil accommodating chamber 43. In other words, an angle (a minor angle) $\theta_1$ which is formed by the inner surface 443B to which the oil outlet port 442b is opened and the tangent d to the inner circumferential surface 40b of the accommodating portion 40c is set to an angle which is larger than an angle (a minor angle) $\theta_2$ (in this embodiment, the inner surface 442A coincides with the tangent b, $\theta_2=0°$. $\theta_2$ is not shown) which is formed by the inner surface 442A of the oil inlet port 441a and the tangent b to the inner circumferential surface 40b of the accommodating portion 40c ($\theta_2<\theta_1$). Therefore, a smooth introduction of the lubricating oil from the oil outlet port 442b into the interior of the tank 44 is made difficult when the four-wheel drive vehicle 200 travels forwards in the four-wheel drive mode, whereby a sufficient amount of lubricating oil is reserved in the accommodating space 12a and the oil accommodating chamber 43.

The case lid member 41 is attached to the case main body 40 by bolts 42 and is formed by a cap member which allows the inner shaft 13 (which will be described later) to be inserted therethrough as a whole. Attachment of the case lid member 41 to the case main body is performed by using a positioning pin 411.

A lid portion 41a which faces the mounting portion 40C of the case main body 40 via a speed reducing mechanism 9A and the like and an outer cylindrical portion 41b which projects to an outer end face of the lid portion 41a are provided on the case lid member 41. An auxiliary accommodating space 44A which communicates with the main accommodating space 42A is provided between the lid portion 41a and the mounting portion 40C. A support shaft 45A which is parallel to the guides 43A is mounted on the lid portion 41a and the mounting portion 40C. Additionally, a shaft insertion hole 41c through which the inner shaft 13 is inserted is provided in the case lid member 41.

The drive source 5 has an electric motor 50, is accommodated in a drive source housing 52A and is mounted on a speed reducing mechanism housing 94 with bolts 53A. Additionally, in the drive source 5, a motor shaft (a drive shaft as an input shaft) 50a of the electric motor 50 is connected to the cam mechanism 16A (a cam member 17A which will be described later) via the speed reducing mechanism 9A and a gear transmission mechanism 10A. By adopting this configuration, a motor rotational force (a driving force) of the electric motor 50 is decelerated at the speed reducing mechanism 9A and is transmitted from the gear transmission mechanism 10A to the cam member 17A via a gear portion 170a in an ensured fashion.

A motor housing 51A is fixed to the drive source housing 52. A rotational part of the electric motor 50 is disposed so as to rotate relative to the motor housing 51A and is connected to the motor shaft 50a. In the electric motor 50, the motor shaft 50a rotates relative to the motor housing 51A.

Figure 12:
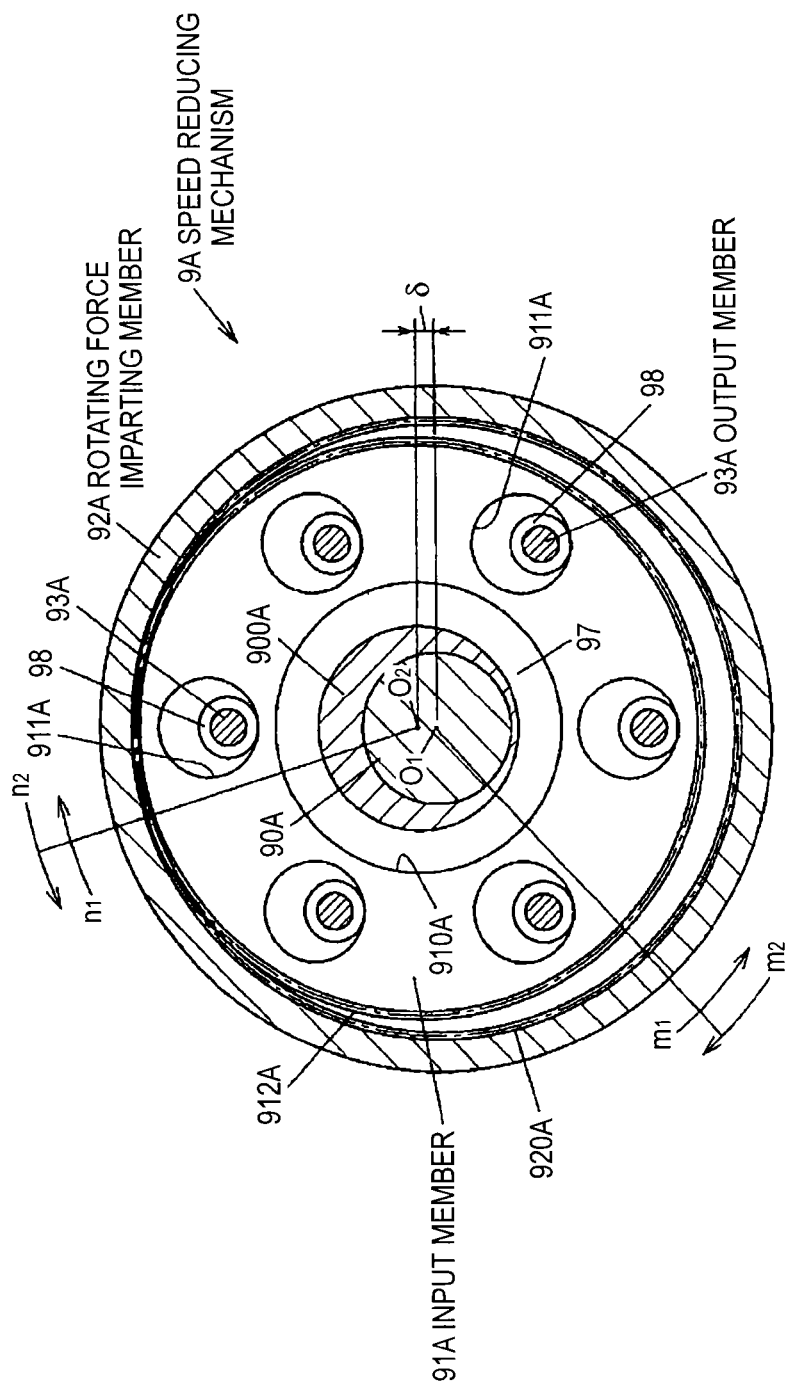
FIG. 12 is a sectional view schematically depicting the speed reducing mechanism of the driving force transmission apparatus according to the second embodiment of the invention.

FIG. 12 shows the speed reducing mechanism. In this embodiment, the speed reducing mechanism is an eccentric oscillating speed reducing mechanism and is specifically an involute speed reducing mechanism with a small difference in numbers of teeth in the eccentric oscillating speed reducing mechanisms. It is possible to obtain a large reduction gear ratio by using the eccentric oscillating speed reducing mechanism. As shown in FIGS. 10 and 12, the speed reducing mechanism 9A has the rotational shaft 90A, an input member 91A, a rotating force imparting member 92A and a plurality of (six in this embodiment) output members 93A, is disposed so as to be interposed between the drive source housing 52A and the mounting portion 40C of the case main body 40 and is accommodated in a speed reducing mechanism housing 94. Additionally, the speed reducing mechanism 9A decelerates the motor rotational force of the electric motor 50 and transmits it to the gear transmission mechanism 10A.

The rotational shaft 90A has an eccentric portion 900A which adopts as a center axis thereof an axis $O_2$ which is eccentric by an eccentric amount 8 in parallel from an axis $O_1$ (which is equal to a rotational center axis $O_1$ of the rotational shaft 90A) of the motor shaft 50a of the electric motor 50, is connected to the motor shaft 50a and is supported rotatably on a housing element 940 of the speed reducing mechanism housing 94 and a first gear (a driven shaft as an output shaft) 100A of the gear transmission mechanism 10A via ball bearings 95, 96, respectively.

The input member 91A is made up of an external gearwheel having a center hole 910A which adopts an axis $O_3$ (the axis $O_2$ in this embodiment) as a center axis thereof, is accommodated in the speed reducing mechanism housing 94 and is supported rotatably on the rotational shaft 90A with a needle roller bearing 97 interposed between an inner circumferential surface of the center hole 910A and an outer circumferential surface of the eccentric portion 900A. Other types of rolling bearings may be adopted in place of the needle roller bearing 97 as long as they can bear a radial load. Additionally, the input member 91A receives the motor rational force from the electric motor 50 to perform circular motions which are eccentric by the eccentric amount 8 in directions indicated by arrows $m_1$, $m_2$ (the axis $O_2$ performs an orbital motion about the axis $O_1$).

A plurality of (six in this embodiment) pin insertion holes 911A as through holes are provided in the input member 91A so as to be aligned circumferentially at equal intervals about the axis $O_2$. A bore diameter of the pin insertion hole 911A is set to a dimension which is larger than a dimension resulting from the addition of an outside diameter of the needle roller bearing 98 to the eccentric amount 8. An external gear 912A having an involute tooth profile of a pitch circle which adopts the axis $O_2$ as a center axis thereof is provided in an outer circumferential surface of the input member 91A. A spacer 913A with holes is disposed on a side of the input member 91A which faces the electric motor 50 so as to be interposed between a motor side end face thereof and the speed reducing mechanism housing 94.

The rotating force imparting member 92A is made up of an internal gearwheel which adopts an axis $O_4$ (the axis $O_1$ in this embodiment) as a center axis thereof, is disposed so as to be interposed between the housing element 940 of the speed reducing mechanism housing 94 and the mounting portion 40C of the apparatus case 4, and is formed of an annular member which is opened in the direction of the axis $O_1$ on both sides thereof as a whole and which makes up part of the speed reducing mechanism housing 94. Additionally, the rotating force imparting member 92A meshes with the input member 91A and imparts a rotating force in directions indicated by arrows n1, n2 (about the axis $O_2$) to the input member 91A which receives the motor rotational force from the electric motor 50 to revolve. An internal gear 920A of an involute tooth profile is provided in an inner circumferential surface of the rotating force imparting member 92A so as to mesh with the external gear 912A of the input member 91A. Assuming that the number of teeth of the internal gear 920A is referred to as $Z_3$ and that the number of teeth of the external gear 912A of the input member 91A is referred to as $Z_2$, a reduction gear ratio α of the speed reducing mechanism 9A is calculated from $α=Z_2/(Z_3-Z_2)$.

The plurality of output members 93A are each made up of a pin having a substantially uniform outside diameter and are inserted through the pin insertion holes 911A in the input member 91A to be mounted in pin mounting holes 1000A in the first gear 100A of the gear transmission mechanism 10A. Additionally, the plurality of output members 93A receive the rotating force imparted by the rotating force imparting member 92A from the input member 91A and output it to the first gear 100A.

Needle roller bearings 98 are individually mounted on outer circumferential surfaces of the plurality of output members 93A so as to reduce contact resistance between inner circumferential surfaces of the pin insertion holes 911A in the input member 91A and the outer circumferential surfaces of the output members 93A.

The gear transmission mechanism 10A has the first gear 100A and a second gear 101A, is disposed so as to be interposed between the speed reducing mechanism 9A and the cam mechanism 16A, and is accommodated in the apparatus case 4. The gear transmission mechanism 10A receives the driving force from the drive source 5 which is decelerated at the speed reducing mechanism 9A and transmits it to the cam mechanism 16A.

The first gear 100A is disposed on the axis $O_1$ of the rotational shaft 90A and is supported rotatably within the apparatus case 4 via ball bearings 102, 103. The first gear 100A has cylindrical portions 1001A to 1004A having outside diameters which are different from each other and is formed of a stepped cylindrical member which is opened in an axial direction at both sides thereof.

The cylindrical portion 1001A has the outside diameter which is larger than the respective outside diameters of the cylindrical portions 1002A to 1004A and is disposed near the speed reducing mechanism 9A. The ball bearing 102 is disposed so as to be interposed between an outer circumferential surface of the cylindrical portion 1001A and an inner circumferential surface of a through hole 400C in the case main body 40 (the mounting portion 40C).

The cylindrical portion 1002A is disposed so as to be interposed between the cylindrical portion 1001A and the cylindrical portion 1003A. A seal mechanism 104 is disposed so as to be interposed between an outer circumferential surface of the cylindrical portion 1002A and the inner circumferential surface of the through hole 400C of the case main body 40 (the mounting portion 40C).

The cylindrical portion 1003A has the outside diameter which is smaller than the outside diameter of the cylindrical portion 1002A and is disposed so as to be interposed between the cylindrical portion 1002A and the cylindrical portion 1004A. A gear portion 1005A which meshes with a gear portion 1010A of the second gear 101A is provided on an outer circumferential surface of the cylindrical portion 1003A.

The cylindrical portion 1004A has the outside diameter which is smaller than the respective outside diameters of the cylindrical portions 1001A to 1003A and is disposed near the case lid member 41 (the lid portion 41a). The ball bearing 103 is disposed so as to be interposed between an outer circumferential surface of the cylindrical portion 1004A and an inner circumferential surface of a recess hole 410a in the case lid member 41 (the lid portion 41a).

The second gear 101A is disposed in a position where the gear portion 1010A meshes with the gear portion 1005A of the first gear 100A and is supported rotatably on the support shaft 45A via a ball bearing 105. A spacer 106 is disposed around an outer circumference of the support shaft 45A so as to be interposed between the ball bearing 105 and the case main body 40.

(Configuration of the Multiple Disc Clutch 8)

The multiple disc clutch 8 is, as shown in FIG. 9, made up of a friction-type clutch which has a plurality of inner clutch plates 80 (first clutch plates) and a plurality of outer clutch plates 81 (second clutch plates) which are aligned in the direction of the rotational axis O and is disposed between the housing 12 and the inner shaft 13.

Additionally, the multiple disc clutch 8 disconnectably connects the housing 12 and the inner shaft 13 to each other by bringing adjacent inner and outer clutch plates of the inner clutch plates 80 and the outer clutch plates 81 into friction engagement with each other and releasing the friction engagement therebetween.

The inner clutch plates 80 and the outer clutch plates 81 are disposed alternately along the rotational axis O and are formed into an annular friction plate as a whole. A clearance C between any two adjacent clutch plates of the inner clutch plates 80 and the outer clutch plates 81 in an initial condition is set to a dimension which prevents a friction engagement of the two adjacent clutch plates which would otherwise be generated due to drag torque based on the viscosity of lubricating oil when the four-wheel drive vehicle 200 (shown in FIG. 1) travels forwards in the two-wheel drive mode.

The plurality of inner clutch plate 80 each have a straight spline fitting portion 80a on an inner circumferential portion thereof. The inner clutch plate 80 is fitted on a straight spline fitting portion 132a of a cylindrical portion 13a (the inner shaft 13) so as to be connected to the inner shaft 13 in such a way as not to rotate relative to the inner shaft 13 but to move relative thereto.

A plurality of oil holes 80b are provided in each of the plurality of inner clutch plates 80 so as not only to be aligned side by side along a circumferential direction thereof but also to be opened in the direction of the rotational axis O.

The outer clutch plate 81 has a straight spline fitting portion 81a on an outer circumferential portion thereof. The outer clutch plate 81 is fitted on a straight spline fitting portion 121c (which will be described later) of the second housing element 121 so as to be connected to the housing 12 in such a way as not to rotate relative to the housing 12 but to move relative thereto.

(Configuration of the Housing 12)

The housing 12 is, as shown in FIG. 9, made up of the first housing element 120 and the second housing element 121, is disposed on an axis (the rotational axis O) of the rear wheel axle shaft 213R (shown in FIG. 1), and is supported rotatably in the apparatus case 4 via needle roller bearings 122, 123.

The first housing element 120 is made up of a shaft-shaped member which adopts the rotational axis O as an axis thereof, is disposed at one side (a left-hand side in FIG. 9) end portion of the housing 12, and is connected to a side gear 214R (shown in FIG. 1) through spline fitting. The needle roller bearing 122 is disposed so as to be interposed between an outer circumferential surface of the first housing element 120 and inner circumferential surfaces of the element insertion hole 40A and the cylindrical portion 40B. A seal mechanism 124 is disposed so as to be interposed between the outer circumferential surface of the first housing element 120 and the inner circumferential surface of the cylindrical portion 40B on an axis of the element insertion hole 40A. A recess portion 120a which is made up of a round hole which is opened to the cam mechanism 16A is provided in the first housing element 120.

The second housing element 121 is disposed at the other side (a right-hand side in FIG. 9) end portion of the housing 12, and is formed of a bottomed cylindrical member which is opened to the cam mechanism 16A. An accommodating space 121a is formed in the second housing element 121 so as to accommodate the multiple disc clutch 8 between the inner shaft 13 and itself. Additionally, a straight spline fitting portion 121c is provided in the second housing element 121, and this straight spline fitting portion 121c is exposed to an inner circumferential surface (the accommodating space 121a) of the second housing element 121 and is made up of a plurality of splines $121c_1$ which are aligned in parallel along a circumferential direction of the second housing element 121. An oil inlet path $121c_2$ having an opening portion $1210c_2$ which is opened to the cam mechanism 16A and the accommodating space 121a and which communicates with the oil accommodating chamber 43 (the annular space 43a) is provided in the straight spline fitting portion 121c by removing part (for example, three splines) of the plurality of splines $121c_1$. By adopting this configuration, lubricating oil in the accommodating space 121a flows through the oil outlet path $121c_2$ to be let out from the opening portion $1210c_2$ into the oil accommodating chamber 43 (the annular space 43a) based on a centrifugal force generated as the housing 12 rotates when the four-wheel drive vehicle 200 (shown in FIG. 1) travels forwards in the two-wheel drive mode. The needle roller bearing 123 is disposed so as to be interposed between a bottom portion of the second housing element 121 and an inner circumferential edge of an opening in the element insertion hole 40A of the case main body 40.

(Configuration of the Inner Shaft 13)

The inner shaft 13 is, as shown in FIG. 9, disposed on the rotational axis O of the housing 12 and is supported rotatably on the housing 12 via needle roller bearings 130, 131 and on the case lid member 41 via a ball bearing 132. The inner shaft 13 has cylindrical portions 13a to 13c having outside diameters which are different from each other, a shaft portion 13D and is formed of a bottomed cylindrical member which is opened to one axial side (towards a rear wheel 205R shown in FIG. 1). The inner shaft 13 allows a distal end portion of a rear wheel axle shaft 213R (shown in FIG. 1) to be inserted into an opening portion thereof for accommodation. The rear wheel axle shaft 213R is connected to the inner shaft 13 in such a way as not to rotate relative to the inner shaft 13 but to move relative thereto through spline fitting.

The cylindrical portion 13a is disposed so as to be interposed between the cylindrical portion 13c and the shaft portion 13D. An outside diameter of the cylindrical portion 13a is set to a dimension which is larger than respective outside diameters of the cylindrical portions 13b, 13c and the shaft portion 13D. A straight spline fitting portion 132a is provided on an outer circumferential surface of the cylindrical portion 13a, and this straight spline fitting portion 132a is exposed to the accommodating space 121a in the second housing element 121 and fits in the straight spline fitting portions 80a of the inner clutch plates 80. The needle roller bearing 131 is disposed so as to be interposed between a bottom portion of the cylindrical portion 13a and a bottom portion of the second housing element 121.

The cylindrical portion 13b is disposed at a one side (a right-hand side in FIG. 9) end portion of the inner shaft 13. The outside diameter of the cylindrical portion 13b is set to a dimension which is smaller than the outside diameter of the cylindrical portion 13c. A seal mechanism 133 is disposed so as to be interposed between an outer circumferential surface of the cylindrical portion 13b and an inner circumferential surface of the shaft insertion hole 41c in the case lid member 41.

The cylindrical portion 13c is disposed so as to be interposed between the cylindrical portion 13a and the cylindrical portion 13b. The outside diameter of the cylindrical portion 13c is set to a dimension between the outside diameter of the cylindrical portion 13a and the outside diameter of the cylindrical portion 13b.

The shaft portion 13D is disposed at the other side (a left-hand side in FIG. 9) end portion of the inner shaft 13 and is accommodated in a recess portion 120a of the first housing element 120. The outside diameter of the shaft portion 13D is set to a dimension which is smaller than the respective outside diameters of the cylindrical portions 13a to 13c. The needle roller bearing 130 is disposed so as to be interposed between an outer circumferential surface of the shaft portion 13D and an inner circumferential surface of the recess portion 120a in the first housing element 120.

(Configuration of the Cam Mechanism 16A)

Figure 13:
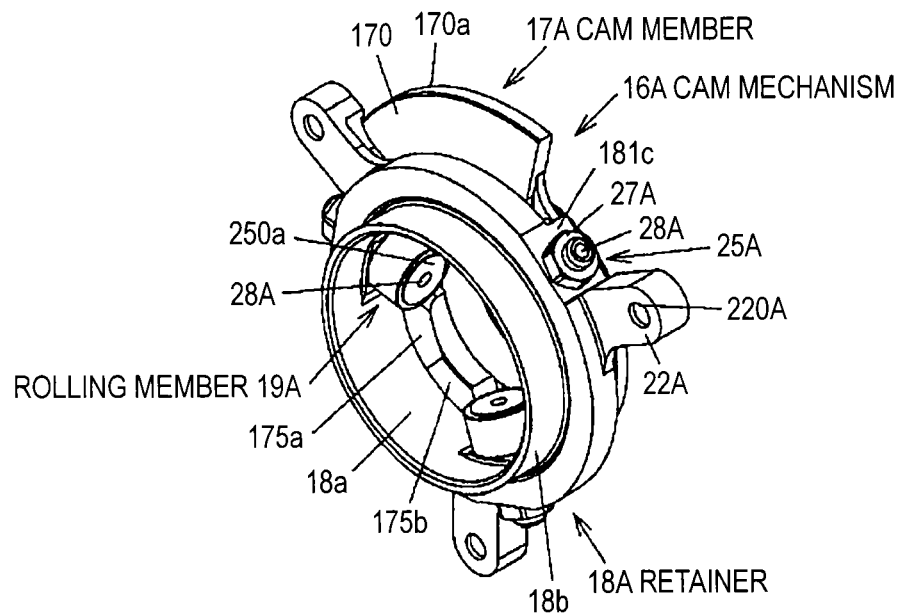
FIG. 13 is a perspective view depicting a cam mechanism of the driving force transmission apparatus according to the second embodiment of the invention.

FIG. 13 shows the cam mechanism. As shown in FIGS. 9 and 13, the cam mechanism 16A has the cam member (the input member) 17A, a retainer (an output member) 18A and rolling members 19A, is disposed around an outer circumference of the cylindrical portion 13c of the inner shaft 13 and is accommodated in the main accommodating space 42A of the apparatus case 4. Then, the cam mechanism 16A transforms a motor rotational force from the drive source 5 (the electric motor 50) (a driving force from the speed reducing mechanism 9A) into a cam thrust which imparts a pressing force which constitutes a clutch operating force to the multiple disc clutch 8. The cam thrust includes a second cam thrust $P_2$ which reduces the clearance C between any adjacent two of the inner clutch plates 80 and the outer clutch plates 81 of the multiple disc clutch 8 to, for example, C=0 and a first cam thrust $P_1$ which brings the inner clutch plates 80 and the outer clutch plates 81 of the multiple disc clutch 8 into friction engagement with each other.

Figure 14:
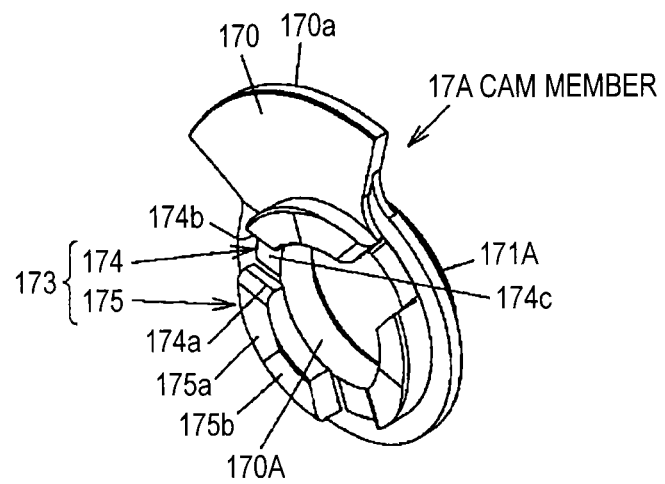
FIG. 14 is a perspective view depicting a cam member in the cam mechanism of the driving force transmission apparatus according to the second embodiment of the invention.

FIG. 14 shows the cam member. As shown in FIGS. 9 and 14, the cam member 17A has a shaft insertion hole 170A through which the inner shaft 13 is inserted, is disposed at one side (a right-hand side in FIG. 9) of the cam mechanism 16A and is formed of an annular member which rotates about the rotational axis O.

A projecting piece 170 is provided on an outer circumferential edge of the cam member 17A so as to project in a radial direction thereof. A gear portion 170a is provided on the projecting piece 170 so as to mesh with the second gear 101A (the gear portion 1010A) of the gear transmission mechanism 10A.

A cylindrical portion 171A is provided on an axial side end face of the cam member 17A so as to project from a circumferential edge of an opening in the shaft insertion hole 170A towards a rear wheel 205 (shown in FIG. 1). A needle roller bearing 171 is disposed so as to be interposed between an inner circumferential surface of the cylindrical portion 171A and an outer circumferential surface of the cylindrical portion 13c of the inner shaft 13. A needle roller bearing 172 is disposed so as to be interposed between the other axial side (a left-hand side in FIG. 9) end face of the cam member 17A and a clutch side end face of the case lid member 41. The other axial side (the left-hand side in FIG. 9) end face of the cam member 17A is formed by an irregular surface 173 as a cam surface which faces the multiple disc clutch 8.

The irregular surface 173 has recess portions 174 and projecting portions 175 which are aligned alternately about an axis of the cam member 17A and imparts the first cam thrust $P_1$ and the second cam thrust $P_2$ which are directed along the rotational axis O to the rolling members 19A by rolling the rolling members 19A. In this embodiment, assuming that one recess portion 174 and one projecting portion 175 which lie adjacent to each other in a circumferential direction of the cam member 17A are referred to as one irregular portion, the irregular surface 173 is made up of three irregular portions.

The recess portion 174 is formed of a cutout having a rectangular cross section which has a pair of cut-out side surfaces 174a, 174b and a cut-out bottom surface 174c which is interposed between the pair of cut-out side surfaces 174a, 174b.

The cut-out side surface 174a functions as a guide surface having a curved surface which guides the rolling members 19A from the recess portion 174 to the projecting portion 175 on one side around the rotational axis O. The other cut-out side surface 174b functions as a stopper surface which is substantially at right angles to the cut-out bottom surface 174c on the other side around the rotational axis O.

The projecting portion 175 is disposed so as to be interposed between any two adjacent recess portions of the three recess portions 174. In the projecting portion 175, an end face on a side which faces the rolling member 19A is made up of surfaces 175a, 175b which lie adjacent to each other in a circumferential direction of the cam member 17A.

The surface 175a is formed of a raceway surface which is made up of an inclined surface whose thickness in the direction of the axis of the cam member 17A (a projecting height of the projecting portion 175) increases gradually from a side which faces the recess portion 174 towards the other surface 175b. By adopting this configuration, assuming that of both circumferential end portions of the surface 175a, an end portion which faces the recess portion 174 is referred to as an initiating end portion $175a_1$ (shown in FIG. 17), the cam mechanism 16A outputs the second cam thrust $P_2$ from the retainer 18A with the rolling member 19A disposed at the initiating end portion $175a_1$. Additionally, assuming that both the circumferential end portions of the surface 175a, an end portion on an opposite side (a side which faces the other surface 175b) to the initiating end portion $175a_1$ is referred to as a terminating end portion $175a_2$ (shown in FIG. 17), the cam mechanism 16A outputs the first cam thrust $P_1$ from the retainer 18A with the rolling member 19A disposed between the initiating end portion $175a_1$ and the terminating end portion $175a_2$.

The other surface 175b is formed of a flat plane having such a dimension that the thickness in the direction of the axis of the cam member 17A is made substantially uniform.

Figure 15:
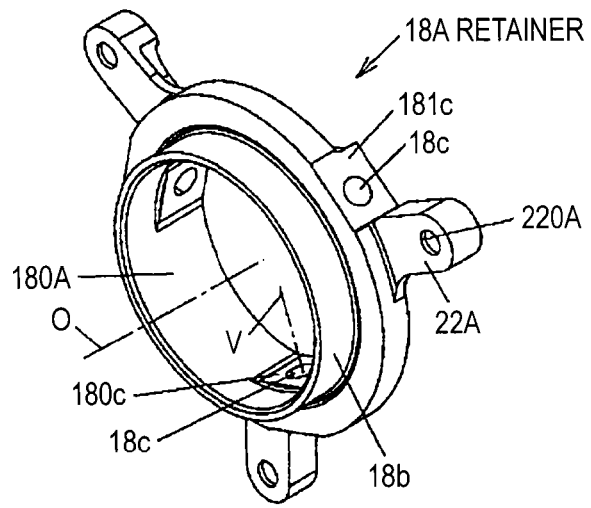
FIG. 15 is a perspective view depicting an output member (a retainer) in the cam mechanism of the driving force transmission apparatus according to the second embodiment of the invention.

FIG. 15 shows the output member (the retainer). As shown in FIGS. 9 and 15, the retainer 18A has a shaft insertion hole 180A through which the inner shaft 13 is inserted, is disposed at the other side (the left-hand side in FIG. 9) end portion of the cam mechanism 16A and is formed of an annular member which can move in the direction of the rotational axis O. Additionally, the retainer 18A is made up of a retainer whose rotation is restricted by the plurality of guides (fixing guides) 43A to thereby output the first cam thrust $P_1$ and the second cam thrust $P_2$ towards the multiple disc clutch 8 and which retains rotatably the rolling members 19A. The shaft insertion hole 180A functions as an accommodating space which accommodates the rolling members 19A.

A cylindrical portion 18b is provided on a clutch side end face of the retainer 18A so as to project from a circumferential edge of an opening in the shaft insertion hole 180A towards the multiple disc clutch 8. An annular pressing member 20A is disposed around an outer circumference of the cylindrical portion 18b, and this annular pressing member 20A receives the first cam thrust $P_1$ and the second cam thrust $P_2$ from the retainer 18A to press against the multiple disc clutch 8 (the outer clutch plate 81). A needle roller bearing 21A is disposed so as to be interposed between one side (an opposite side to a multiple disc clutch side end face) end face of the pressing member 20A and the clutch side end face of the retainer 18A. A shim 26B is disposed so as to be interposed between the needle roller bearing 21A and the retainer 18A to adjust intervals of the clutch plates of the multiple disc clutch 8.

A plurality of (three in this embodiment) projecting pieces 22A are provided on an outer circumferential edge of the retainer 18A so as to project in a radial direction thereof. The plurality of projecting pieces 22A are disposed at equal intervals in the circumferential direction of the retainer 18A. A guide insertion hole 220A through which the guide 43A is inserted is provided in each of the plurality of projecting pieces 22A. A bearing bush 23A is disposed so as to be interposed between an inner circumferential surface of the guide insertion hole 220A and an outer circumferential surface of the guide 43A. By adopting this configuration, resistance generated when the retainer 18A moves along the guides 43A is reduced. Return springs 24A are disposed so as to be interposed between circumferential edges of openings in the guide insertion holes 220A and a spring bearing surface 40d of the case main body 40.

A plurality of (three in this embodiment) pin insertion holes 18c are provided in the retainer 18A, and the pin insertion holes 18c are opened to inner and outer circumferential surfaces of the retainer 18A and allow support pins 25A to be inserted therethrough. The plurality of pin insertion holes 18c each have an axis V which intersects the axes of the cam member 17A and the retainer 18A (the rotational axis O) at right angles and are disposed near the corresponding projecting pieces 22A. Seat surfaces 180c where annular roller bearings 26A are seated are provided at inner circumferential edges of openings in the plurality of pin insertion holes 18c, and seat surfaces 181c where nuts 27 are seated are provided at outer circumferential edges of the openings in the plurality of pin insertion holes 18c.

The support pin 25A has two large and small body portions 25a, 25b (a large-diameter body portion 25a, a small-diameter body portion 25b) which have outside diameters which are different from each other and is mounted in the retainer 18A with its axial movement restricted by the body portion 25a and the nut 27A. A core material 28A is embedded in the support pin 25A with an axis of the former aligned with an axis of the latter.

The large-diameter body portion 25a is disposed at an axial side (a side facing the rotational axis O) end portion of the support pin 25A while being exposed to an interior of the shaft insertion hole 180A. An outer circumferential surface of the large-diameter body portion 25a functions as an inner raceway surface of needle rollers 29A. A collar portion 250a is provided on the large-diameter portion 25a, and this collar portion 250a projects to the outer circumferential surface at a rotational axis O side end portion and faces a roller bearing member 26A via the plurality of needle rollers 29A.

The small-diameter body portion 25b is disposed at the other axial side (a side facing the guide 43A) end portion of the support pin 25A while being inserted through the pin insertion hole 18c. A thread portion 250b on which the nut 27A is screwed (joined) is provided on the small-diameter body portion 25b.

Figure 16:
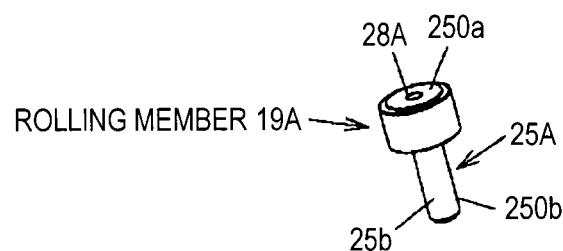
FIG. 16 is a perspective view depicting a rolling member and a supporting pin in the cam mechanism of the driving force transmission apparatus according to the second embodiment of the invention.

FIG. 16 shows the rolling member and the support pin. As shown in FIGS. 9 and 16, the rolling members 19A are disposed in the shaft insertion hole 180A in the retainer 18A. The rolling member 19A is formed of a cylindrical member. An outer circumferential surface of the rolling member 19A rolls on the irregular surface 173 (shown in FIG. 14). Additionally, the rolling member 19A is disposed on the axis V (shown in FIG. 15) of the pin insertion hole 18c and is supported rotatably on an outer circumferential surface of the large-diameter body portion 25a via the needle rollers 29A.

A cylindrical projecting portion 190A is provided on the rolling member 19A, and this cylindrical projecting portion 190A projects towards the needle rollers 29A at an axially central portion. An axial side end face of the projecting portion 190A faces an end face of the collar portion 250a, and the other axial side end face thereof faces an end face of the roller bearing member 26A. An inner circumferential surface of the projecting portion 190A functions as an outer raceway surface of the needle rollers 29A. The support pin 25A, the plurality of needle rollers 29A and the rolling member 19A correspond to an inner ring (or an inner shaft), rolling elements and an outer ring of a bearing, respectively, and in these constituent components, an outer circumferential surface of the outer ring is a kind of roller which rolls on the irregular surface 173.

(Operation of the Driving Force Transmission Apparatus 1A)

Figure 17:
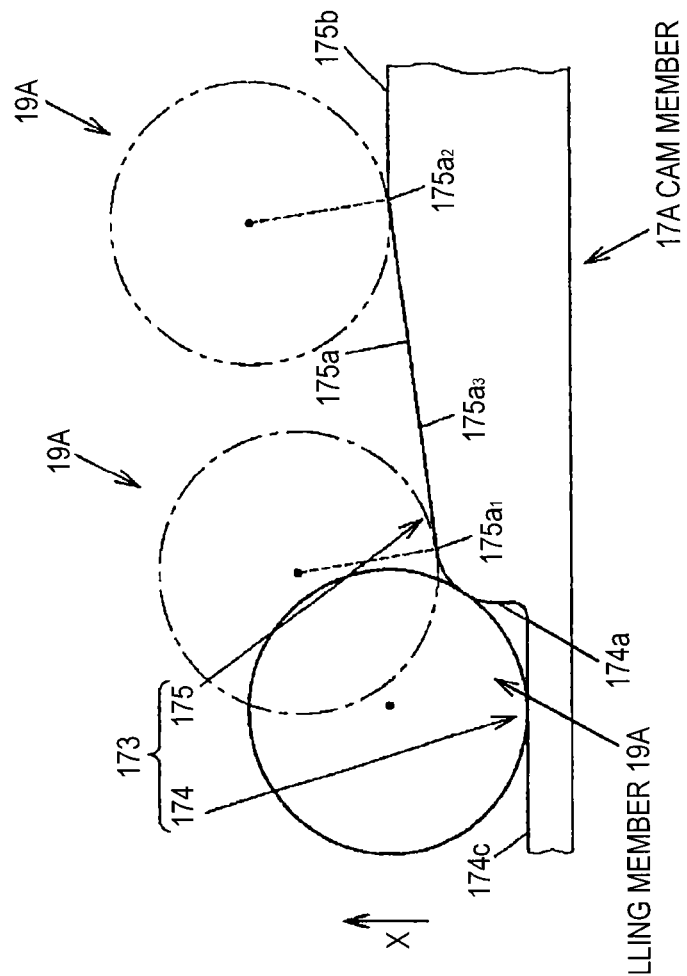
FIG. 17 is a side view simply depicting an operation of the cam mechanism of the driving force transmission apparatus according to the second embodiment of the invention.

Next, the operation of the driving force transmission apparatus described in this embodiment will be described by the use of FIGS. 1, 9, 11 and 17. FIG. 17 shows an operating condition of the rolling member of the cam mechanism.

In FIG. 1, when the four-wheel drive vehicle 200 travels forwards in the two-wheel drive mode, the rotational driving force of the engine 202 is transmitted to the front differential 206 via the transmission 203. Then, the rotational driving force of the engine 202 is transmitted from the front differential 206 to front wheels 204L, 204R via front wheel axle shafts 208L, 208R, whereby front wheels 204L, 204R are driven to rotate.

As this occurs, in a driving connection and disconnection apparatus 3, torque cannot be transmitted between a first spline portion 3a and a second spline portion 3b. Additionally, in (an upper half of) FIG. 9, since the electric motor 50 of the drive source 5 is not energized, the motor rotational force of the electric motor 50 is not transmitted to the cam mechanism 16A via the speed reducing mechanism 9A and the gear transmission mechanism 10A, and the cam mechanism 16 never operates. In addition, the rolling members 19A are in abutment with the bottom surfaces 174c of the recess portions 174, and the inner clutch plates 80 and the outer clutch plates 81 are out of friction engagement.

Here, the oil flow S of lubricating oil generated as the four-wheel drive vehicle 200 travels forwards in the two-wheel drive mode will be described. As shown in FIG. 11, when the four-wheel drive vehicle 200 travels forwards in the two-wheel drive mode, the housing 12 rotates in a direction indicated by an arrow $Q_1$ as a result of the rotation of the rear wheel 205L.

In association with this, receiving the centrifugal force generated by the rotation of the housing 12, the lubricating oil in the accommodating space 121a in the second housing element 121 is let out from the opening portion $1210c_2$ of the oil outlet path $121c_2$ into the oil accommodating chamber 43 (the annular space 43a), forming the oil flow S which follows the inner circumferential surface 40b of the case main body 40.

Because of this, the lubricating oil flows along the inner circumferential surface 40b of the case main body 40, and part thereof flows into the first tank portion 44a of the tank 44 from the oil inlet port 441a thereof to be reserved in the first tank portion 44a. The lubricating oil in the first tank portion 44a flows into the second tank portion 44b by way of a communication path 44c which is interposed between the first tank portion 44a and the second tank portion 44b to be reserved in the second tank portion 44b, as well.

As this occurs, since the opening area of the oil outlet port 442b is set to the area which is smaller than the opening area of the oil inlet port 441a, the amount of lubricating oil which flows out from the oil outlet port 442b to the outside of the tank 44 becomes smaller than the amount of lubricating oil which flows into the tank 44 from the oil inlet port 441a, whereby the lubricating oil tends to be easily reserved accordingly.

Consequently, in this embodiment, it is possible to suppress the occurrence of drag torque between the inner clutch plates 80 and the outer clutch plates 81 which would otherwise result from a reduction in the amount of lubricating oil in the oil accommodating chamber 43 when the four-wheel drive vehicle travels forwards in the two-wheel drive mode.

On the other hand, in order for the four-wheel drive vehicle 200 in the two-wheel drive mode to be switched to the four-wheel drive mode, the propeller shaft 2 and the rear wheel axle shaft 213R are connected together so that torque can be transmitted therebetween by the driving force transmission apparatus 1. The front differential case 212 and the propeller shaft 2 are kept connected so that torque can be transmitted therebetween by the driving force connection and disconnection apparatus 3. The propeller shaft 2 and the rear wheel axle shaft 213L are normally connected together so that torque can be transmitted therebetween via the rear differential 207 and the like.

Because of this, the rotational driving force of the engine 202 is transmitted from the propeller shaft 2 to the rear wheel 205L via the rear differential 207, the rear wheel axle shaft 213L and the like, whereby the rear wheel 205L is driven to rotate.

Here, in order to connect the propeller shaft 2 and the rear wheel axle shaft 213R together by the driving force transmission apparatus 1, as shown (in a lower half of) FIG. 9, the motor rotational force of the electric motor 50 is imparted to the cam mechanism 16A to actuate the cam mechanism 16A. As this occurs, when the cam mechanism 16A is actuated, the cam member 17A rotates in one direction (a direction in which the retainer 18A is moved in a direction indicated by an arrow X) about the rotational axis O.

In association with this, the rolling member 19A rolls from a condition (an initial condition) where the rolling member 19A is disposed in the recess portion 174 in the irregular surface 173 of the cam member 17A as indicated by a solid line in FIG. 17 and rides on the surface 175a of the projecting portion 175 of the cam member 17A to be disposed at the initiating end portion $175a_1$ as indicated by an alternate long and short dash line in FIG. 17. As this occurs, in the cam mechanism 16A, the motor rotational force of the electric motor 50 is transformed into the second cam thrust $P_2$ which reduces the clearances C (shown in FIG. 9) between the inner clutch plates 80 and the outer clutch plates 81 of the multiple disc clutch 8 to C=0.

Because of this, the rolling member 19A moves towards the multiple disc clutch 8 (in the direction indicated by the arrow X) along the rotational axis O and presses against the retainer 18A in the moving direction via the needle rollers 29A and the support pin 25A.

In association with this, the retainer 18A moves in the direction indicated by the arrow X against the spring forces of the return springs 24A to press the pressing member 20A in the direction in which the inner clutch plates 80 and the outer clutch plates 81 move to approach each other.

This causes the pressing member 20A to press the inner clutch plates 80 and the outer clutch plates 81 in the direction indicated by the arrow X, whereby the clearance C (not shown) between any two adjacent clutch plates becomes, for example, C=0.

Next, when the cam member 17A receives the motor rotational force of the electric motor 50 to rotate further in the one direction about the rotational axis O, the rolling member 19A rolls to move from the position indicated by the alternate long and short dash line in FIG. 17 and rolls over the surface 175a of the projecting portion 175 towards the other surface 175b. Thereafter, the rolling member 19A reaches the terminating end portion $175a_2$ of the surface 175a to ride on the other surface 175b of the projecting portion 175. As this occurs, when the rolling member 19A reaches a side lying near the terminating end portion $175a_2$ of, for example, a range where the rolling member 19A rolls on the surface 175a between the initiating end portion $175a_1$ and the terminating end portion $175a_2$, in the cam mechanism 16A, the motor rotational force of the electric motor 50 is transformed into the first cam thrust $P_1$ which brings the inner clutch plates 80 and the outer clutch plates 81 into friction engagement with each other.

Because of this, the rolling member 19A moves towards the multiple disc clutch 8 (in the direction indicated by the arrow X) along the rotational axis O as indicated by a chain double-dashed line in FIG. 17 and presses the retainer 18A in the moving direction via the needle rollers 29A and the support pin 25A.

In association with this, the retainer 18A moves in the direction indicated by the arrow X against the spring forces of the return springs 24A to press the pressing member 20A in the direction in which the inner clutch plates 80 and the outer clutch plates 81 are brought into friction engagement with each other.

This causes the pressing member 20A to press the inner clutch plates 80 and the outer clutch plates 81 in the direction indicated by the arrow X, whereby any two adjacent clutch plates are brought into friction engagement with each other.

Due to this, the rotational driving force of the engine 202 is transmitted from the housing 12 to the inner shaft 13 and is further transmitted from the inner shaft 13 to the rear wheel 205R via the rear wheel axle shaft 213R, whereby the rear wheel 205R is driven to rotate.

Here, the oil flow T of lubricating oil generated when the four-wheel drive vehicle 200 travels forwards in the four-wheel drive mode will be described. As shown in FIG. 11, the housing 12 rotates in a direction indicated by an arrow $Q_2$ by the drive of the engine 202 when the four-wheel drive vehicle 200 travels forwards in the four-wheel drive mode.

In association with this, receiving the centrifugal force generated by the rotation of the housing 12, the lubricating oil in the accommodating space 121a in the second housing element 121 is let out from the opening portion 1210$c_2$ of the oil outlet path 121$c_2$ into the oil accommodating chamber 43 (the annular space 43a), forming the oil flow T which follows the inner circumferential surface 40b of the case main body 40. Because of this, the lubricating oil in the oil accommodating chamber 43 flows along the inner circumferential surface 40b of the case main body 40.

As this occurs, the angle (the minor angle) $\theta_1$ which is formed by the inner surface 443B to which the oil outlet port 442b is opened and the tangent d to the inner circumferential surface 40b of the accommodating portion 40c is set to the angle which is larger than the angle (the minor angle) $\theta_2$ (in this embodiment, the inner surface 442A coincides with the tangent b, $\theta_2 = 0°$. $\theta_2$ is not shown) which is formed by the inner surface 442A of the oil inlet port 441a and the tangent b to the inner circumferential surface 40b of the accommodating portion 40c ($\theta_2 < \theta_1$). Therefore, a smooth introduction of the lubricating oil from the oil outlet port 442b into the interior of the tank 44 is made difficult when the four-wheel drive vehicle 200 travels forwards in the four-wheel drive mode, whereby a sufficient amount of lubricating oil is reserved in the accommodating space 12a and the oil accommodating chamber 43.

[Advantage of the Second Embodiment]

The following advantages can be obtained according to the second embodiment that has been described heretofore.

(1) The amount of lubricating oil in the oil accommodating chamber 43 is reduced when the four-wheel drive vehicle 200 travels forwards in the two-wheel drive mode, thereby making it possible to reduce the drag torque, and the response to the clutching operation in the multiple disc clutch 8 can be enhanced when the four-wheel drive vehicle 200 is shifted from the two-wheel drive mode to the four-wheel drive mode.

(2) The sufficient amount of lubricating oil can be reserved in the oil accommodating chamber 43 when the four-wheel drive vehicle 200 travels forwards in the four-wheel drive mode, and therefore, the damage can be suppressed which would otherwise be caused due to the heat generated in the clutch plates when the inner clutch plates 80 and the outer clutch plates 81 of the multiple disc clutch 8 are brought into friction engagement with each other.

(3) The first cam thrust $P_1$ and the second cam thrust $P_2$ are obtained by rotating the cam member 17A only by restricting the rotation of the retainer 18A, and therefore, the installation space of the cam mechanism 16A is prevented from being expanded to the conventional level. Additionally, the restriction of the rotation of the retainer 18A allows the rolling members 19A to roll while following the rotation of the cam member 17A, thereby making it possible to ensure a desired cam action when the cam mechanism 16A is actuated.

(4) The rolling members 19A are accommodated in the shaft insertion hole 18a in the retainer 18A, and therefore, an axial dimension of the cam mechanism 16A can be reduced, which can contribute to a miniaturization of the overall size of the apparatus.

(5) The retainer 18A moves along the plurality of guides 43A which are aligned in the circumferential direction thereof, and therefore, the rotation thereof is restricted by the plurality of guides 43A.

(6) The rolling members 19A are the cylindrical rollers, and therefore, the rolling members 19A roll while in line contact with the cam member 17A. This can enhance the load carrying capacity for radial loads compared with a case where the rolling members are balls.

(7) In the cam member 17A, a two-stage cam which moves the retainer 18A towards the multiple disc clutch 8 (to obtain the first cam thrust $P_1$ and the second cam thrust $P_2$) can be obtained by the irregular surface 173. In this case, the one surface 175a of the projecting portion 175 in the irregular surface 173 is formed by the raceway surface whose axial thickness increases gradually along the circumferential direction of the cam member 17A, and therefore, when the rolling member 19A rolls in the direction in which the rolling member 19A rolls up on the one surface 175a (from the initiating end portion 175$a_1$ side towards the terminating end portion 175$a_2$ side thereof), the moving amount of the retainer 18A towards the multiple disc clutch 8 increases.

(8) The cam member 17A has the gear portion 170a which meshes via the speed reducing mechanism 9A and the gear transmission mechanism 10A. Because of this, the motor rotational force of the electric motor 50 is decelerated at the speed reducing mechanism 9A and is thereafter transmitted from the gear transmission mechanism 10A to the cam member 17A via the gear portion 170a in an ensured fashion.

Third Embodiment

Figure 18:
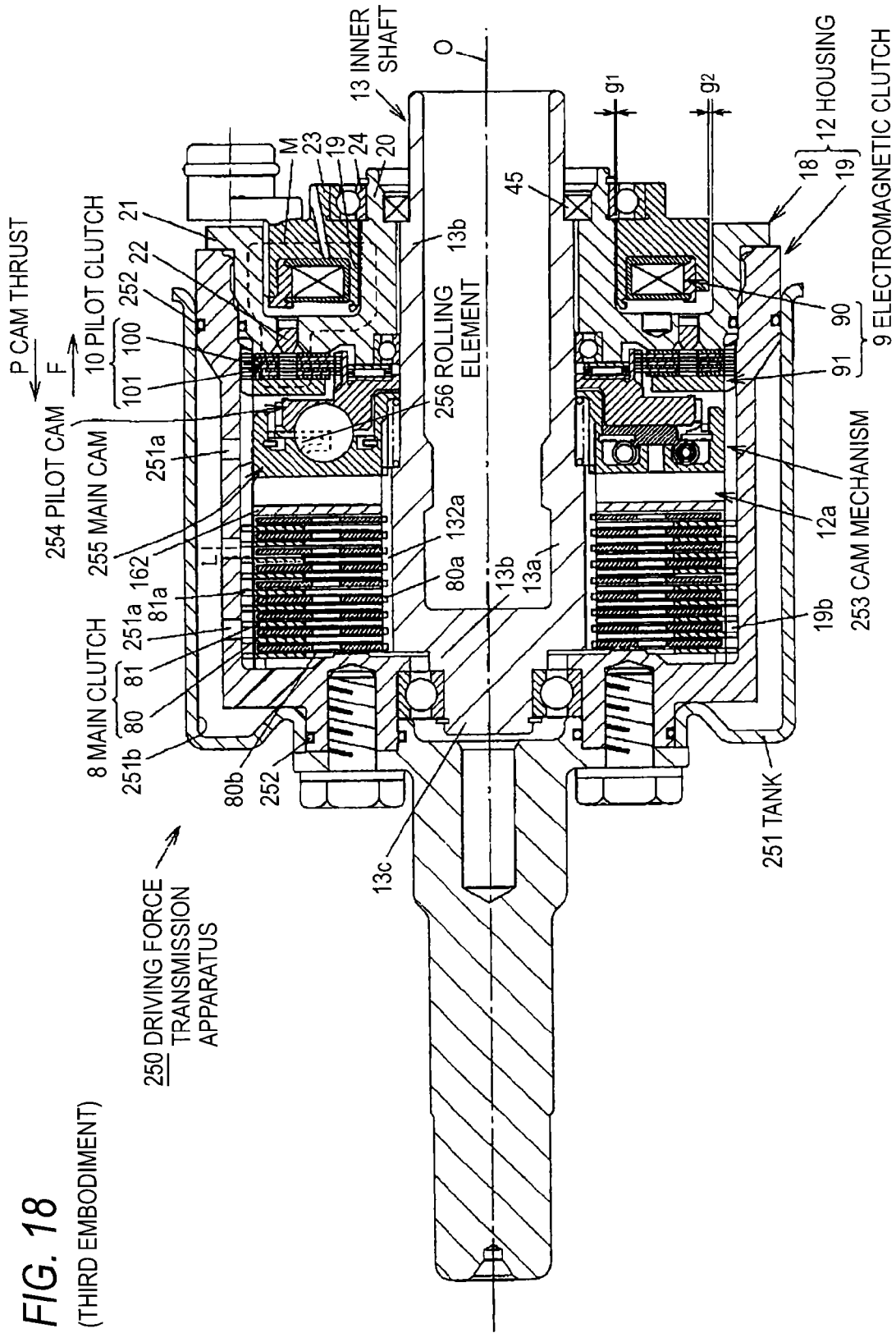
FIG. 18 is a sectional view depicting a whole of a driving force transmission apparatus according to a third embodiment of the invention.

Next, a driving force transmission apparatus according to a third embodiment of the invention will be described by the use of FIG. 18. FIG. 18 shows the whole (partially omitted) of the driving force transmission apparatus. In FIG. 18, like reference numerals will be given to like or similar members to those shown in FIG. 3, and a detailed description thereof will be omitted.

As shown in FIG. 18, a driving force transmission apparatus 250 according to the third embodiment of the invention is characteristic in that the driving force transmission apparatus 250 has oil inlet ports 251a which are opened in a radial direction of a housing 12 and which double as oil outlet ports and includes a cylindrical tank 251 which rotates together with the housing 12.

Because of this, the tank 251 is disposed on a rotational axis O with a seal member 252 interposed between an inner circumferential surface 251b thereof and an outer circumferential surface of the housing 12 (an outer circumferential surface of a rear housing 19) and is mounted on the outer circumferential surface of the housing 12 (the rear housing 19). Additionally, the tank 251 rotates together with the housing 12 and lets lubricating oil in an accommodating space 12a into an interior thereof from the oil inlet ports 251a based on a centrifugal force generated as the housing 12 rotates when a four-wheel drive vehicle 200 (shown in FIG. 1) travels forwards in a two-wheel drive mode to reserve the lubricating oil therein. Additionally, in the housing 12, the rear housing 19 is disposed on a side which faces a rear differential 207 (a left-hand side in FIG. 18), and a front housing 18 is disposed on a side which faces a rear wheel 205R (a right-hand side in FIG. 18).

The oil inlet ports 251a communicate with the tank 251 and the accommodating space 12a, and a plurality of (three shown in FIG. 18) oil inlet ports 251a are disposed in a cylindrical portion of the rear housing 19 along the rotational axis O, the oil inlet port 251a being formed by a through hole having an axis L which intersects the rotational axis O at right angles as a whole. Additionally, the oil inlet ports 251a let the lubricating oil in the accommodating space 12a into the tank 251 therethrough when the housing 12 rotates. In addition, the oil inlet ports 251a function as the oil outlet ports through which the lubricating oil in the tank 251 is let out therefrom into the accommodating space 12a when the housing 12 stops rotating.

In the driving force transmission apparatus 250 that has been configured as described above, the lubricating oil in the accommodating space 12a flows into the tank 251 through the first oil inlet ports 251a by virtue of the centrifugal force generated in association with the rotation of the housing 12 or its own weight to be reserved therein.

Consequently, in this embodiment, the amount of lubricating oil in the accommodating space 12a and an oil accommodating chamber 43 is reduced when the four-wheel drive vehicle travels forwards in the two-wheel drive mode, whereby the occurrence of drag torque between inner clutch plates 80 and outer clutch plates 81 is suppressed.

In addition, in this embodiment, since a space portion is defined outside the tank 251, a gap $g_1$ is defined between an inner circumferential surface of a coil holder 23 and an outer circumferential surface of the front housing 18 (a first housing element 20), and a gap $g_2$ is defined between an outer circumferential surface of the coil holder 23 and an inner circumferential surface of the front housing 18 (a second housing element 21), whereby the occurrence of drag torque between the coil holder 23 and the front housing 18 is suppressed.

It is noted that a single cam mechanism 253 is used in the driving force transmission apparatus 250 in place of the first cam mechanism 15 and the second cam mechanism 16 which are described in the first embodiment.

The cam mechanism 253 has a pilot cam 254, a main cam 255 and rolling elements 256 and is disposed so as to be interposed between the housing 12 and an inner shaft 13. Additionally, the cam mechanism 253 imparts a pressing force to a main clutch 8 by means of a cam action (a cam thrust P) which is generated between the pilot cam 254 and the main cam 255 as a result of receiving a rotational force of the housing 12 from the pilot clutch 10.

[Advantage of the Third Embodiment]

According to the third embodiment that has been described heretofore, the following advantage can be obtained.

The occurrence of drag torque is suppressed not only between the inner clutch plates 80 and the outer clutch plates 81 but also between the coil holder 23 and the front housing 18, and therefore, the bad influences imposed by the drag torque can be suppressed.

Thus, while the driving force transmission apparatus of the invention has been described heretofore based on the embodiments thereof, the invention is not limited to the embodiments described above and hence can be carried out in various forms without departing from the spirit and scope thereof. Thus, for example, the following modifications are possible.

(1) In the embodiment, the support pin 25A and the rolling member 19A rotate relative to each other, and therefore, the needle rollers 29A are used as the rolling elements which are interposed between these two members. However, the invention is not limited thereto, and hence, as rolling elements other than the needle rollers 29A, rolling elements of other forms may be used, which include balls, cylindrical rollers, rod-shaped rollers, conical rollers, rollers with a convex surface, rollers with a concave surface and the like.

(2) In the embodiment, the speed reducing mechanism 9A has been described as being the involute speed reducing mechanism with a small difference in numbers of teeth in the eccentric oscillating speed reducing mechanism. However, the invention is not limited thereto, and hence, for example, an eccentric oscillating speed reducing mechanism such as a cycloid speed reducing mechanism or the like may be used, and other speed reducing mechanisms than the eccentric oscillating speed reducing mechanism may be used.

(3) In the embodiments, the second cam thrust $P_2$ is described as being generated to reduce the clearance C between the inner clutch plate 80 (the first clutch plate) and the outer clutch plate 81 (the second clutch plate) to, for example, C=0. However, the invention is not limited thereto, and hence, a second cam thrust may be generated which reduces a clearance between an inner clutch plate and an outer clutch plate to such a clearance which is smaller than a clearance in an initial condition.

(4) In the embodiments, the invention is described as being applied to the four-wheel drive vehicle 200 in which the front wheels 204L, 204R are the main drive wheels and the rear wheels 205L, 205R are the auxiliary drive wheels. However, the invention is not limited thereto, and hence may be applied to a four-wheel drive vehicle in which front wheels are auxiliary drive wheels and rear wheels are main drive wheels.

(5) In the embodiments, the housing 12 is described as being connected to the input shaft side and the inner shaft 13 is described as being connected to the output shaft side. However, the invention is not limited thereto, and the same advantages as those of the embodiments can be provided even though the housing is connected to the output shaft side and the inner shaft is connected to the input shaft side.

DESCRIPTION OF REFERENCE NUMERALS AND CHARACTERS 1, 1A driving force transmission apparatus; 2 propeller shaft; 3 driving force connection and disconnection apparatus; 3a first spline portion; 3b second spline portion; 3c sleeve; 4 apparatus case; 40 case main body; 40a mounting portion; 40b inner circumferential surface; 400a through hole; 40c accommodating portion; 41 case lid member; 42 bolt with washer; 5 drive source; 50 electric motor; 50a motor shaft; 51A motor housing; 52A drive source housing; 51 bolt; 52 positioning pin; 53 worm; 53A bolt; 54 transmission member; 54a curved surface portion; 540a external gear; 55 connecting device; 55a cylindrical portion; 55b shaft portion; 56 gear transmission mechanism; 57 snap ring; 58 seal mechanism; 6 gear mechanism; 60 drive pinion; 61 ring gear; 7 gear mechanism; 70 drive pinion; 71 ring gear; 8 main clutch (multiple disc clutch); 80 inner clutch plate; 80a straight spline fitting portion; 80b oil hole; 81 outer clutch plate; 81a straight spline fitting portion; 9 electromagnetic clutch; 90 electromagnetic coil; 90a bobbin; 91 armature; 91a straight spline fitting portion; 10 pilot clutch; 100 inner clutch plate; 100a straight spline fitting portion; 101 outer clutch plate; 101a straight spline fitting portion; 12 housing; 12a accommodating space; 13 inner shaft; 13a to 13c cylindrical portion; 13d, 13e riser surface; 13D shaft portion; 130a flange; 131a oil flow path; 132a straight spline fitting portion; 133a oil path; 15 first cam mechanism; 150 pilot cam; 150a straight spline fitting portion; 150b cam groove; 151 main cam; 151a clutch plate pressing portion; 151b cam groove; 151c oil hole; 151d pin mounting hole; 152 cam follower; 153 needle roller bearing; 154 return spring; 155 guide pin; 16 second cam mechanism; 160 input cam member; 161 output cam member; 162 pressing member; 162a straight spline fitting portion; 162b clutch plate pressing portion; 164 needle roller bearing; 167 projecting piece; 167a external gear; 9A speed reducing mechanism; 90A rotational shaft; 900A eccentric portion; 91A input member; 910A center hole; 911A pin insertion hole; 912A external gear; 913A spacer with hole; 92A rotating force imparting member; 920A internal gear; 93A output member; 10A gear transmission gear; 100A first gear; 1000A pin mounting hole; 101A second gear; 1010A gear portion; 1001A to 1004A cylindrical portion; 1005A gear portion; 16A cam mechanism; 17A cam member; 170 projecting piece; 170a gear portion; 170A shaft insertion hole; 171A cylindrical portion; 171, 172 needle roller bearing; 18A retainer; 180A shaft insertion hole 18b cylindrical portion; 18c pin insertion hole; 180c, 181c seat surface; 173 irregular surface; 174 recess portion; 174a, 174b cut-out side surface; 174c cut-out bottom surface; 175 projecting portion; 175a, 175b surface; 175$a_1$ initiating end portion; 175$a_2$ terminating portion; 19A rolling member; 190A projecting portion; 20A pressing member; 21A needle roller bearing; 22A projecting piece; 220A guide insertion hole; 23A bearing bush; 24A return spring; 25A support pin; 25a, 25b body portion; 250a collar portion; 250b thread portion; 26B shim; 26A roller bearing member; 27A nut; 29A needle roller; 18 front housing; 18a to 18c hole portion; 180b first space portion; 181b second space portion; 182b third space portion; 19 rear housing; 19b straight spline fitting portion; 190b spline; 19c flange; 19d engagement recess portion; 19e outer circumferential surface; 20 first housing element; 20a to 20c body portion; 200a, 201a, 202b oil path; 21 second housing element; 21a engagement projecting portion; 21b oil path; 21c outer circumferential surface; 21d pump forming portion; 210d oil inlet side end portion; 211d oil outlet side end portion; 21e annular space; 22 third housing element; 23 coil holder; 23c accommodating space; 23a, 23h oil path; 24 ball bearing; 25 seal member; 26 positioning pin; 27 annular space; 28 plug element; 29, 30 snap ring; 31 annular space; 32 seal mechanism; 33 needle roller bearing; 34 snap ring; 35 plug element; 36 shaft lid; 36a pump forming portion; 360a outer circumferential surface; 361a oil inlet side end portion; 362a oil outlet side end portion; 37 annular space; 38 ball bearing; 39 bearing member; 42A main accommodating space; 43A guide; 44A auxiliary accommodating space; 45A support shaft; 40C mounting portion; 400C through hole; 40d spring bearing seat; 40A element insertion hoe; 40B cylindrical portion; 411 positioning pin; 41a lid portion; 410a recess hole; 41b outer cylindrical portion; 41c shaft insertion hole; 43 oil accommodating chamber; 43a annular space; 44 tank; 44a first tank portion; 440a bulkhead; 441a oil inlet port; 441A opening surface; 442a oil outlet port; 44b second tank portion; 440b bulkhead; 441b oil inlet port; 442b oil outlet port; 44c communication path; 45 seal mechanism; 46, 47 snap ring; 48 oil receiving portion; 48a flow port; 94 speed reducing mechanism housing; 940 housing element; 95, 96 ball bearing; 97, 98 needle roller bearing; 102, 103 ball bearing; 104 seal mechanism; 105 ball bearing; 106 spacer; 120 first housing element; 120a recess portion; 121 second housing element; 121a accommodating space; 121b outer circumferential surface; 121c straight spline fitting portion; 121$c_1$ spline; 121$c_2$ oil outlet path; 1210$c_2$ opening portion; 122, 123 needle roller bearing; 124 seal mechanism; 130, 131 needle roller bearing; 132 ball bearing; 133 seal mechanism; 250 driving force transmission apparatus; 251 tank; 251a oil inlet port; 251b inner circumferential surface; 252 seal member; 253 cam mechanism; 254 pilot cam; 255 main cam; 256 rolling element; 200 four-wheel drive vehicle; 201 driving force transmission system; 202 engine; 203 transmission; 204L, 204R front wheel; 205L, 205R rear wheel; 206 front differential; 207 rear differential; 208L, 208R front wheel axle shaft; 209L, 209R side gear; 210 pinion gear; 211 gear supporting member; 212 front differential case; 213L, 213R rear wheel axle shaft; 214L, 214R side gear; 215 pinion gear; 216 gear supporting member; 217 rear differential case; A oil inlet path; B oil outlet path; $g_1, g_2$ gap; P cam thrust; $P_1$ first cam thrust; $P_2$ second cam thrust; C clearance; M magnetic circuit; L axis; O rotational axis; S, T oil flow; V axis; $\theta_1, \theta_2$ angle.

The invention claimed is:

1. A driving force transmission apparatus comprising:
a cylindrical first rotational member which is configured to rotate by a drive source of a four-wheel drive vehicle which can be switched between a four-wheel drive mode and a two-wheel drive mode;
a second rotational member at least part of which is accommodated in an interior of the first rotational member and which is disconnectably connected to the first rotational member via a clutch; and
a case having a tank portion which is configured to reserve a lubricating oil in an accommodating space interposed between the second rotational member and the first rotational member, and a cylindrical accommodating portion which accommodates the first rotational member, wherein,
in the case,
the accommodating portion has an inner circumferential surface which faces an outer circumferential surface of the first rotational member, and
the tank portion has an oil inlet port which is opened to the inner circumferential surface of the accommodating portion and through which the lubricating oil in the accommodating space is let in based on a centrifugal force which is generated as the first rotational member rotates when the four-wheel drive vehicle travels forwards in the two-wheel drive mode.

2. The driving force transmission apparatus according to claim 1, wherein
the oil inlet port of the tank portion is opened along a direction of an oil flow of the lubricating oil which is generated as the first rotational member rotates when the four-wheel drive vehicle travels forwards in the two-wheel drive mode.

3. The driving force transmission apparatus according to claim 1, wherein
the case includes an annular space which is interposed between the inner circumferential surface of the accommodating portion and the outer circumferential surface of the first rotational member, and has an oil accommodating chamber which communicates with the accommodating space.

4. The driving force transmission apparatus according to claim 2, wherein
the case has in the tank portion an oil outlet port which is situated downstream of the oil inlet port when the four-wheel drive vehicle travels forwards in the two-wheel drive mode, and the oil outlet port is opened along a direction which intersects the direction of the oil flow.

5. The driving force transmission apparatus according to claim 4, wherein an opening area of the oil inlet port in the tank portion is set to an area which is larger than an opening area of the oil outlet port.

6. The driving force transmission apparatus according to claim 3, wherein the first rotational member has a pump forming portion where a pump is formed between the outer circumferential surface of the first rotational member and an inner circumferential surface of the case so as to cause the lubricating oil in the accommodating space to flow out into the oil accommodating chamber.

7. The driving force transmission apparatus according to claim 6, wherein the first rotational member is set to such a dimension that an outside diameter of the pump forming portion gradually increases from an oil inlet side towards an oil outlet side.

8. The driving force transmission apparatus according to claim 1, wherein the tank portion is formed by a rotational member which rotates together with the first rotational member.

9. The driving force transmission apparatus according to claim 1, wherein the second rotation member is disconnectably connected to the first rotational member by a clutching operation of the clutch based on an operation of a cam mechanism which receives a rotational force from an auxiliary drive source which is different from the drive source.

10. The driving force transmission apparatus according to claim 9, wherein the cam mechanism comprises a cam member which receives the rotational force from the auxiliary drive source to rotate, a rolling member which rolls on the cam member, and a retainer which has an output member outputting a cam thrust to the clutch side as the rolling member rolls, the output member being restricted from rotating about a rotational axis, and which can move in a direction of the rotational axis while retaining the rolling member rollingly.

11. The driving force transmission apparatus according to claim 9, wherein the cam mechanism includes a cam thrust having a first cam thrust for reducing a clearance between a first clutch plate and a second clutch plate which make up the clutch and which are adjacent to each other, and a second cam thrust for bringing the first clutch plate and the second clutch plate into friction engagement with each other, and the cam mechanism transforms the rotational force from the auxiliary drive source into the first cam thrust and the second cam thrust.

12. The driving force transmission apparatus according to claim 11, wherein the cam member has a gear portion which meshes with the auxiliary drive source via a speed reducing mechanism and a gear transmission mechanism.

13. The driving force transmission apparatus according to claim 12, wherein the speed reducing mechanism is an eccentric oscillating speed reducing mechanism into which the rotational force from the auxiliary drive source is input and which reduces speed of the rotational force to output the rotational force to the gear transmission mechanism.

14. The driving force transmission apparatus according to claim 13, wherein the speed reducing mechanism comprises:

a rotational shaft an axis of which is a rotational axis of the auxiliary drive source and which has an eccentric portion a center axis of which is an axis which is parallel to the axis of the rotational shaft;

an input member which is made up of an external gearwheel having a center hole which fits on the eccentric portion of the rotational shaft via a rolling bearing, and a plurality of through holes which are aligned at equal intervals around an axis of the center hole;

a rotating force imparting portion which is made up of an internal gearwheel which meshes with the input member with a number of teeth which is larger than a number of teeth of the external gearwheel; and output members which receive a rotational force imparted by the rotating force imparting member from the input member to output it to the gear transmission mechanism, and which are inserted through the plurality of through holes.

* * * * *